(12) United States Patent
Ishii et al.

(10) Patent No.: US 7,880,736 B2
(45) Date of Patent: Feb. 1, 2011

(54) DISPLAY CONTROL SYSTEM FOR MICROMIRROR DEVICE

(75) Inventors: Fusao Ishii, Menlo Park, CA (US); Taro Endo, Chofu (JP); Yoshihiro Maeda, Hachioji (JP); Kazuma Arai, Hachioji (JP); Hirokazu Nishino, Akishima (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 789 days.

(21) Appl. No.: 11/827,902

(22) Filed: Jul. 12, 2007

(65) Prior Publication Data

US 2008/0024483 A1    Jan. 31, 2008

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/830,521, filed on Jul. 13, 2006.

(51) Int. Cl.
G09G 5/00        (2006.01)

(52) U.S. Cl. ............... 345/214; 345/108; 345/109
(58) Field of Classification Search ................ 345/108, 345/204, 84
See application file for complete search history.

(56) References Cited

U.S. PATENT DOCUMENTS

| 5,287,096 | A  | 2/1994  | Thompson et al. |
| 5,619,228 | A  | 4/1997  | Doherty |
| 5,771,116 | A  | 6/1998  | Miller et al. |
| 5,969,710 | A  | 10/1999 | Doherty et al. |
| 5,986,640 | A  | 11/1999 | Baldwin et al. |
| 6,547,399 | B2 | 4/2003  | Knox |
| 6,570,550 | B1 | 5/2003  | Handschy et al. |
| 6,719,427 | B2 | 4/2004  | Sakashita et al. |
| 6,999,224 | B2 | 2/2006  | Huibers |
| 2005/0206992 | A1 | 9/2005 | Ishii |
| 2005/0254116 | A1 | 11/2005 | Ishii |
| 2007/0132682 | A1 | 6/2007 | Ishii |

*Primary Examiner*—Amare Mengistu
*Assistant Examiner*—Jeffrey S Steinberg
(74) *Attorney, Agent, or Firm*—Bo-In Lin

(57) ABSTRACT

This invention provides a display control system that includes: a) a micromirror array comprising a plurality of mirrors; b) a first control function for controlling the mirrors in a first state; c) a second control function for controlling the mirrors in a second state; d) and a switchover controller for switching from the first state to second state, or from the second state to first state, wherein the switchover controller switches the state of at least two mirrors simultaneously at a same predetermined point within a frame period.

16 Claims, 26 Drawing Sheets

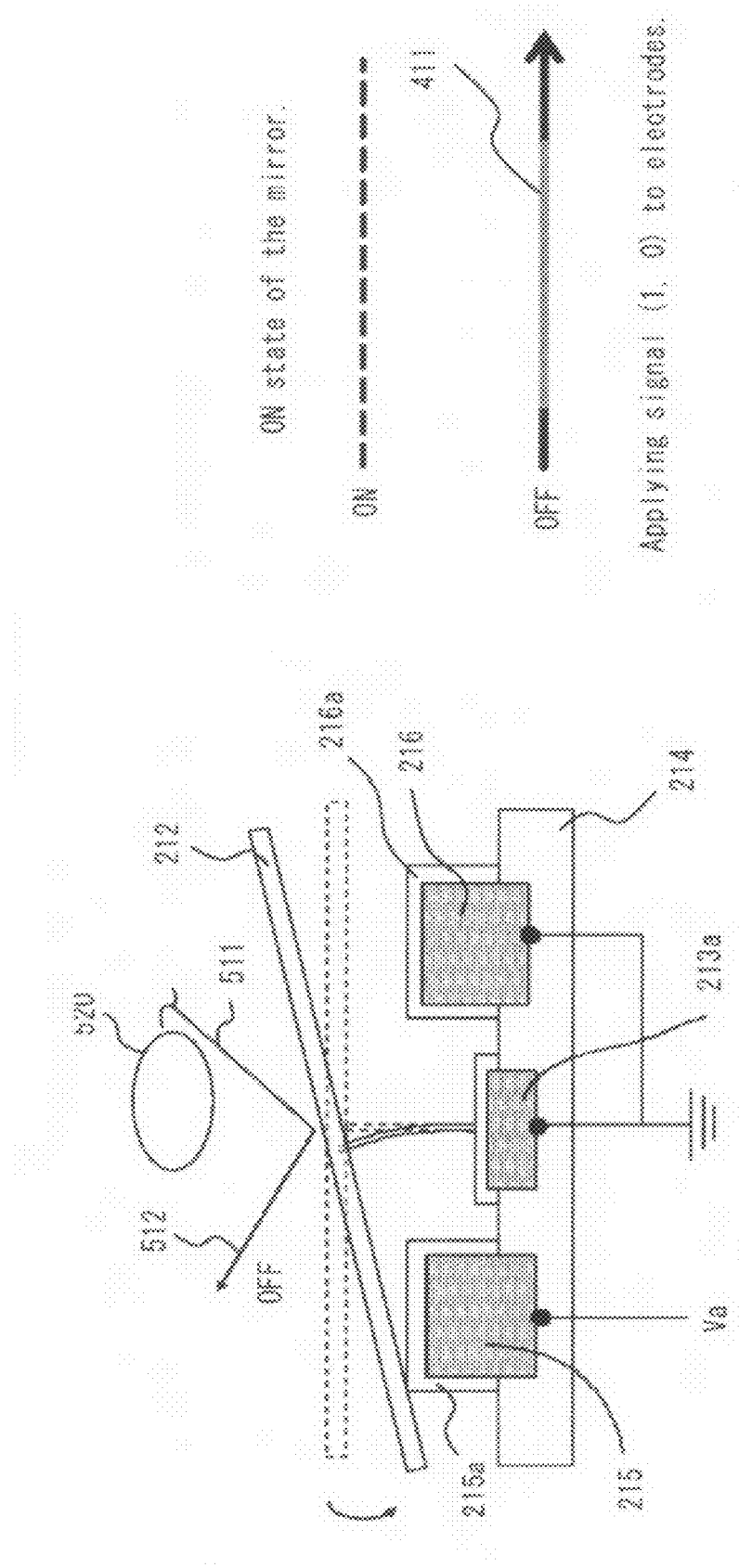

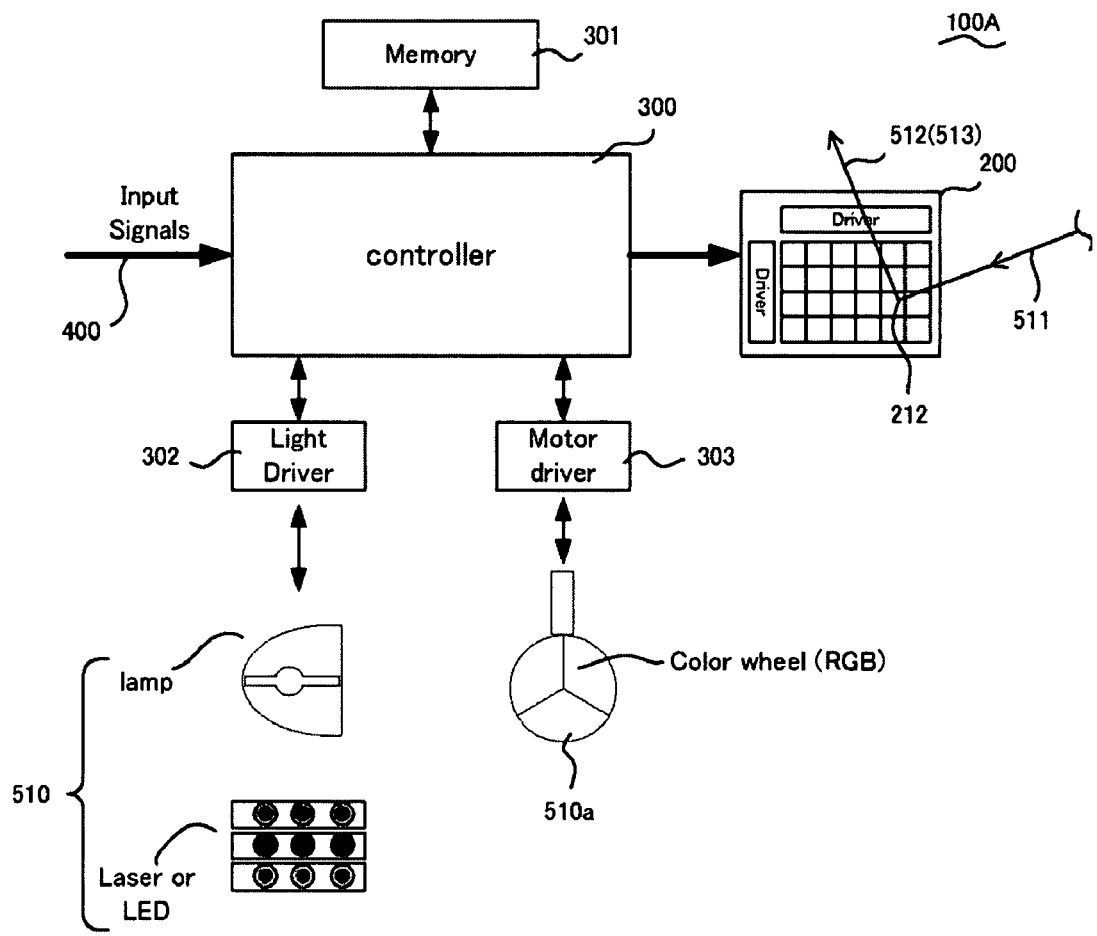
F I G. 1 7

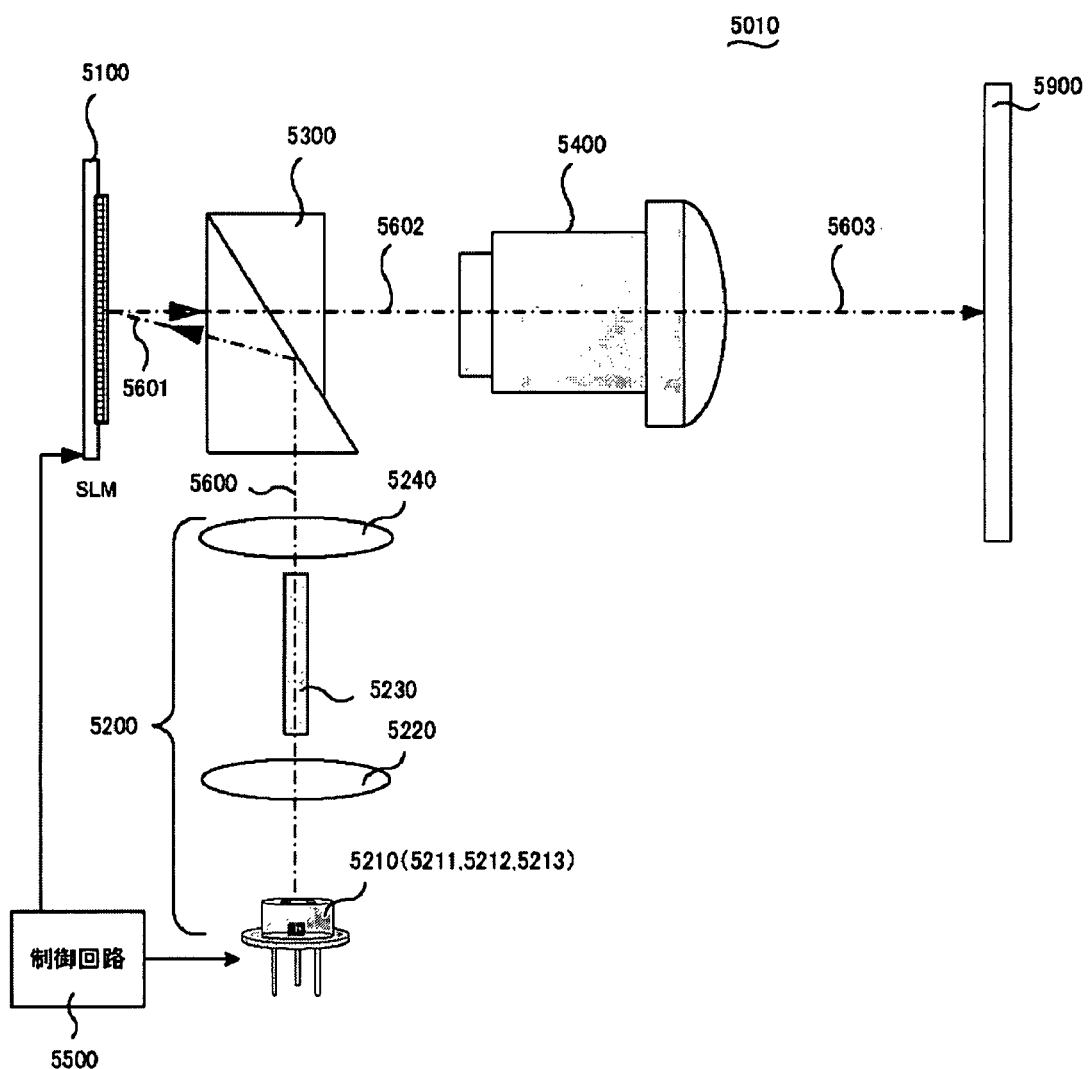
FIG. 25 Projection display system of single SLM panel with varying light source

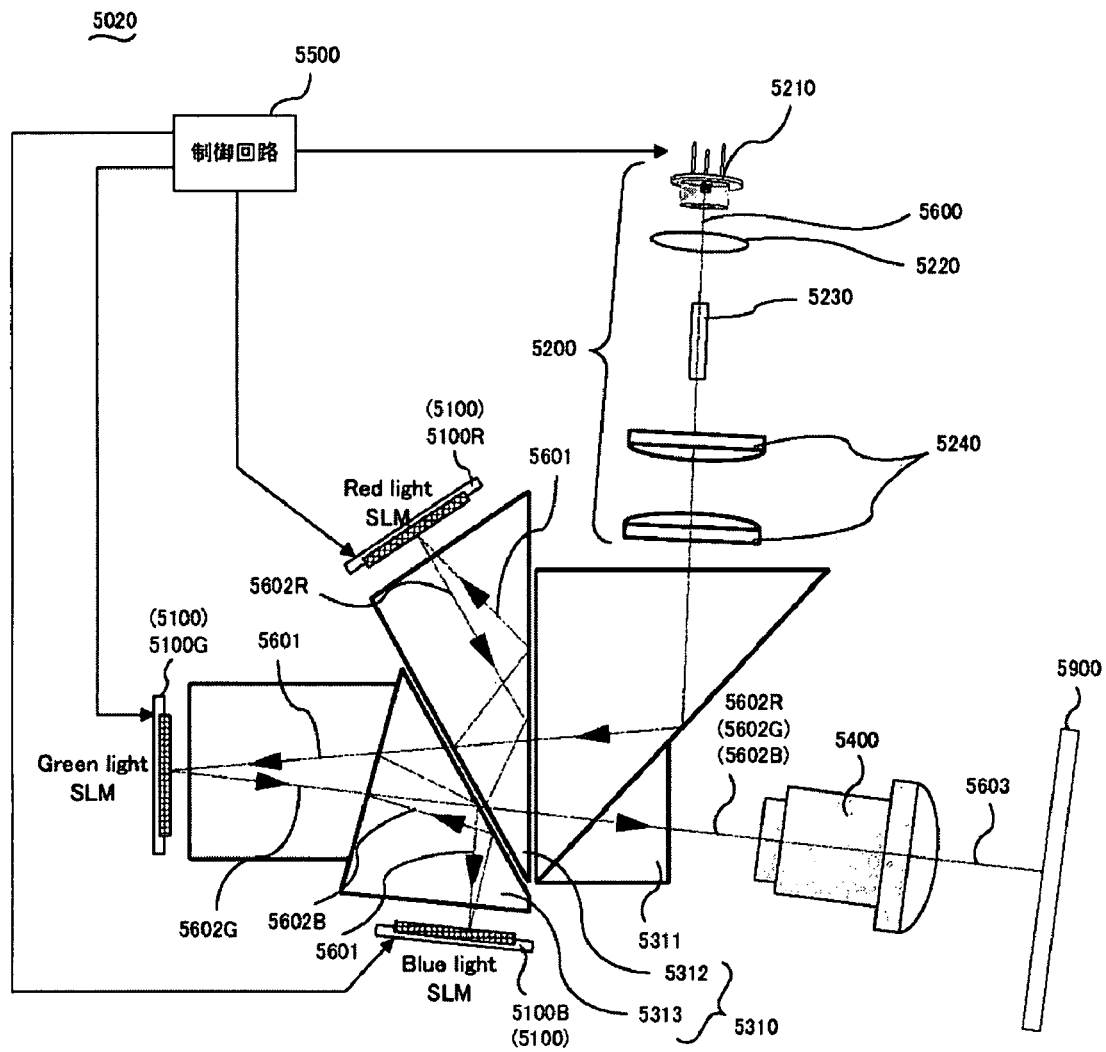
FIG. 26 Projection display system of 3 SLM panels with varying light source

DISPLAY CONTROL SYSTEM FOR MICROMIRROR DEVICE

This application is a Non-provisional Application of a Provisional Application 60/830,521 filed on Jul. 13, 2006. The Provisional Application 60/830,521 is a Continuation in Part (CIP) Application of a U.S. patent application Ser. No. 11/121,543 filed on May 4, 2005 now U.S. Pat. No. 7,268,932. The application Ser. No. 11/121,543 is a Continuation in part (CIP) Application of three previously filed Applications. These three Applications are Ser. No. 10/698,620 filed on Nov. 1, 2003 now abandoned, Ser. No. 10/699,140 filed on Nov. 1, 2003 now U.S. Pat. No. 6,862,127, and Ser. No. 10/699,143 filed on Nov. 1, 2003 now U.S. Pat. No. 6,903,860 by one of the Applicants of this Patent Application. The disclosures made in these Patent Applications are hereby incorporated by reference in this Patent Application.

TECHNICAL FIELD

This invention relates to an image display system, and more particularly to a display system with specially configured and controlled spatial light modulator or light source.

BACKGROUND ART

Even though there have been significant advances made in recent years on the technologies of implementing electromechanical micromirror devices as spatial light modulator, there are still limitations and difficulties when employing them to provide a high quality image display. Particularly, as the display system of the HDTV format becomes popular, an image size on a screen becomes increasingly bigger such as 100" or more in the diagonal size. The pixel size on the screen is more than 1 mm when specification is 100"-size image including 1920×1080 pixels. Similarly, in a 50"-size image and XGA pixels, the pixel size is 1 mm. An observer can see each of the pixels on the screen, for these reasons, the display systems require a high number of gray scales of more than 10-bit or 16-bit, in order to provide a high quality display system. Furthermore, when the display image is digitally controlled, the image quality is adversely affected due to the fact that the image is not displayed with a sufficient number of gray scales.

Electromechanical micromirror devices have drawn considerable interests because of their application as spatial light modulators (SLMs). A spatial light modulator requires an array of a relatively large number of micromirror devices. In general, the number of required devices ranges from 60,000 to several millions for each SLM. Referring to FIG. 1A for a digital video system 1 disclosed in a reference U.S. Pat. No. 5,214,420 that includes a display screen 2. A light source 10 is used to generate light energy for an ultimate illumination of display screen 2. The generated light 9 is further concentrated and directed toward lens 12 by way of a mirror 11. Lenses 12, 13 and 14 form a beam columnator operating to columnate light 9 into a column of light 8. A spatial light modulator 15 is controlled by a computer through data transmitted over a data cable 18 to selectively redirect a portion of the light from a path 7 toward a lens 5 for displaying in a screen 2. The SLM 15 has a surface 16 that includes an array of switchable reflective elements, e.g., micromirror devices 32, such as elements 17, 27, 37, and 47 as reflective elements attached to a hinge 30 that is shown in FIG. 1B. When element 17 is in one position, a portion of the light from the path 7 is redirected along a path 6 to lens 5 where it is enlarged or spread along a path 4 to impinge the display screen 2 so as to form an illuminated pixel 3. When element 17 is in another position, the light is not redirected toward display screen 2 and hence the pixel 3 is dark.

The on- and off-states of a micromirror control scheme as implemented in the U.S. Pat. No. 5,214,420 and by most of the conventional display system impose a limitation on the quality of the display. Specifically, an application of a conventional configuration of control circuit is faced with a limitation that the gray scale of conventional system (PWM between ON and OFF states) is limited by an LSB (i.e., least significant bit, or the least pulse width). Due to the ON-OFF states implemented in the conventional systems, there is no way to provide a shorter pulse width than the LSB. The least brightness, which determines gray scale, is the light reflected during the least pulse width. The limited gray scales lead to degradations of image display.

Specifically, FIG. 1C shows an exemplary circuit diagram of control circuit of a prior art for a micromirror according to U.S. Pat. No. 5,285,407. The control circuit includes a memory cell 32. Various transistors are referred to as "M*" where designates a transistor number, and each transistor is an insulated gate field effect transistor. Transistors M5 and M7 are p-channel transistors; and transistors M6, M8, and M9 are n-channel transistors. The capacitances C1 and C2 represent the capacitive loads presented to the memory cell 32. The memory cell 32 includes an access switch transistor M9 and a latch 32a, which is the basis of a static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, i.e., M5/M6 and M7/M8, which permit two stable states. State 1 is Node A high and Node B low and state 2 is Node A low and Node B high.

The dual-state switching as illustrated by the control circuit controls the micromirrors to position either at an ON or OFF angular orientation as shown in FIG. 1A. The brightness, i.e., the gray scales of display for a digitally control image system, is determined by the length of time the micromirror stays at an ON position. The length of time a micromirror is controlled at an ON position is controlled by a multiple bit word. For simplicity of illustration, FIG. 1D shows the "binary time intervals" when controlled by a four-bit word. As shown in FIG. 1D, the time durations have relative values of 1, 2, 4, 8 that in turn define the relative brightness of each of the four bits where the 1 is for the least significant bit and the 8 is for the most significant bit. According to the control mechanism as shown, the minimum controllable difference between gray scales for displaying images at different levels of light intensities is a quantity of light intensity represented by a "least significant bit" that maintains the micromirror at an ON position for a shortest controllable duration.

When adjacent image pixels are shown with a great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It has been observed in an image of a female model that there are artifacts shown on the forehead, the sides of the nose and the upper arm. The artifacts are generated due to a technical limitation that the digitally controlled display does not provide sufficient gray scales. At the bright spots of display, e.g., the forehead, the sides of the nose and the upper arm, the adjacent pixels are displayed with visible gaps of light intensities.

As the micromirrors are controlled to have either a fully on or a fully off positions, the light intensity is determined by the length of time the micromirror is at the fully on position. In order to increase the number of gray scales of display, the speed of the micromirror must be increased such that the digital control signals can be increased to a higher number of bits.

However, when the speed of the micromirrors is increased, a stronger hinge is necessary for the micromirror to sustain a required number of operational cycles for a designated lifetime of operation. In order to drive the micromirrors supported on a further strengthened hinge, a higher voltage is required. The higher voltage may exceed twenty volts and may even be as high as thirty volts. The micromirrors manufactured by applying the CMOS technologies probably would not be suitable for operation at such a high range of voltages and therefore DMOS micromirror devices may be required. In order to achieve higher degree of gray scale control, a more complicated manufacturing process and larger device areas are necessary when the DMOS micromirror is implemented. Conventional modes of micromirror control are therefore faced with a technical challenge that the gray scale accuracy has to be sacrificed for the benefits of smaller and more cost effective micromirror display due to the operational voltage limitations.

There are many patents related to a light intensity control. These patents include U.S. Pat. Nos. 5,589,852, 6,232,963, 6,592,227, 6,648,476, and 6,819,064. There are further patents and patent applications related to different shapes of light sources. These patents includes U.S. Pat. Nos. 5,442,414, 6,036,318 and Application 20030147052. The U.S. Pat. No. 6,746,123 has disclosed special polarized light sources for preventing light loss. However, these patents or patent application does not provide an effective solution to overcome the limitations caused by insufficient gray scales in the digitally controlled image display systems.

Furthermore, there are many patents related to a spatial light modulation that includes U.S. Pat. Nos. 2,025,143, 2,682,010, 2,681,423, 4,087,810, 4,292,732, 4,405,209, 4,454,541, 4,592,628, 4,615,595, 4,728,185, 4,767,192, 4,842,396, 4,907,862, 5,214,420, 5,506,597, 5,489,952, 6064,366, 6535,319, and 6,880,936. However, these inventions do not address or provide a direct resolution for a person of ordinary skills in the art to overcome the above-discussed limitations and difficulties.

Therefore, a need still exists in the art of image display systems applying digital controls of a micromirror array as a spatial light modulator to provide a new and improved system such that the above-discussed difficulties can be resolved.

SUMMARY OF THE INVENTION

The present invention relates to a new display control system to control a micro-mirror array having a plurality of mirrors. The control system controls the mirrors in a first state and a second state to achieve gray scales, and has a switchover control function for switching the mirrors from the first state to second state. The switchover control function switches the state of plural mirrors at a predetermined point within a frame time. It provides reducing operations for controlling the mirrors. Moreover, changing the timing of the switching point to change the time portion of controlling those two states optimizes the brightness and reduces the visual artifacts.

These and other objects and advantages of the present invention will no doubt become obvious to those of ordinary skills in the art after reading the following detailed description of the preferred embodiment, which is illustrated in the various drawing figures.

BRIEF DESCRIPTION OF FIGURES

The present invention is described in detail below with reference to the following Figures.

FIG. 5A is a description diagram showing an OFF state of a micromirror.

FIG. 5B is a line diagram showing an intensity of light obtained in an OFF state of a micromirror.

FIG. 17 is a functional diagram for showing a display system for implementing a color field sequential technique.

FIG. 25 is a conceptual diagram showing a configuration of a projection apparatus of a single plate system according to a preferred embodiment of the present invention.

FIG. 26 is a conceptual diagram showing a configuration of a projection apparatus of a multiple plate system according to another preferred embodiment of the present invention.

DESCRIPTION OF PREFERRED EMBODIMENTS

Figure 1A:
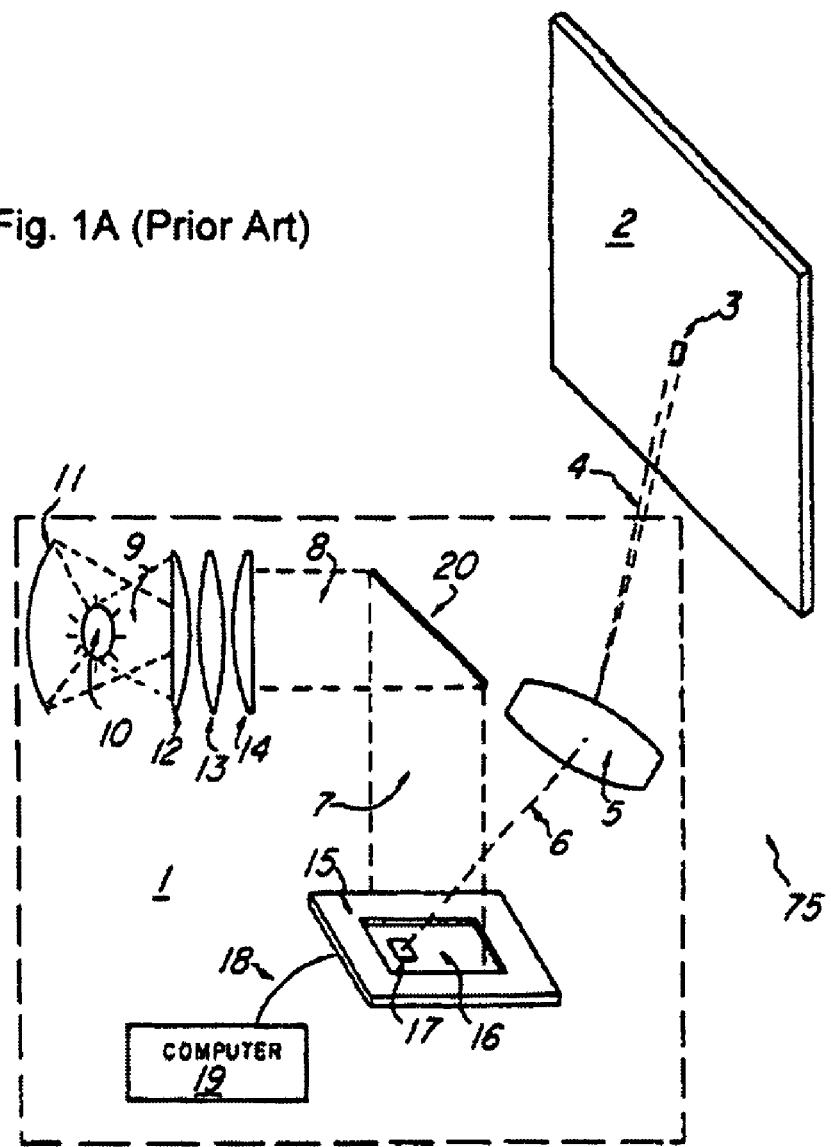
FIG. 1A is a drawing for providing background and prior art display technologies of this invention.
Figure 1B:
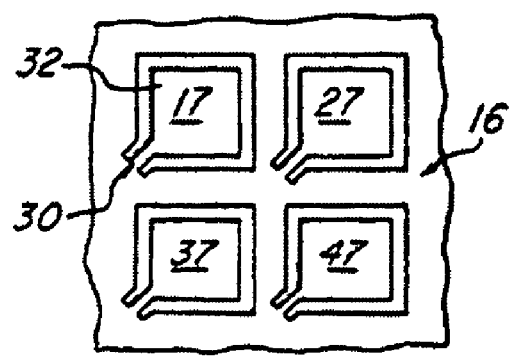
FIG. 1B is a drawing for providing background and prior art display technologies of this invention.
Figure 1C:
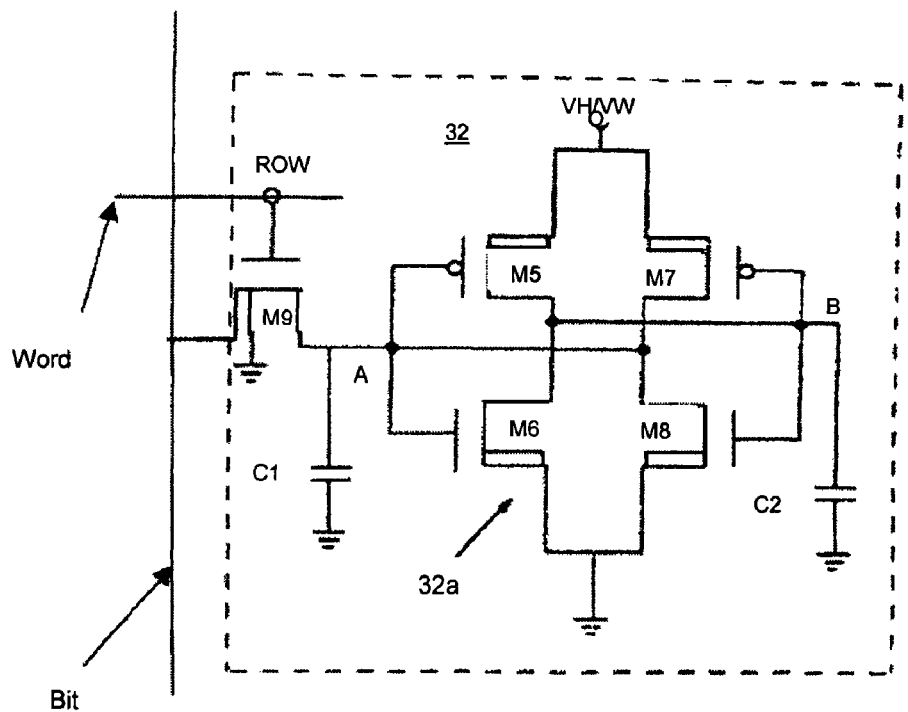
FIG. 1C is a drawing for providing background and prior art display technologies of this invention.
Figure 1D:
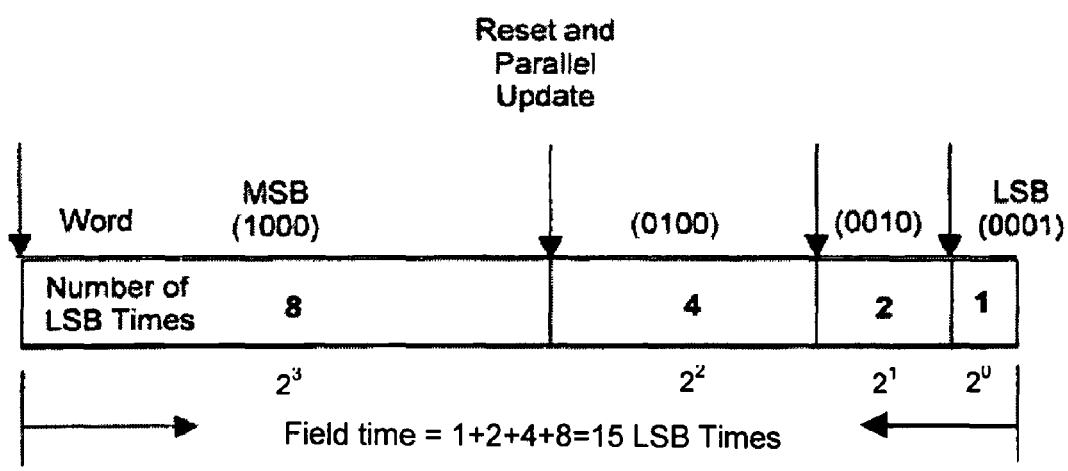
FIG. 1D is a drawing for providing background and prior art display technologies of this invention.
Figure 2:
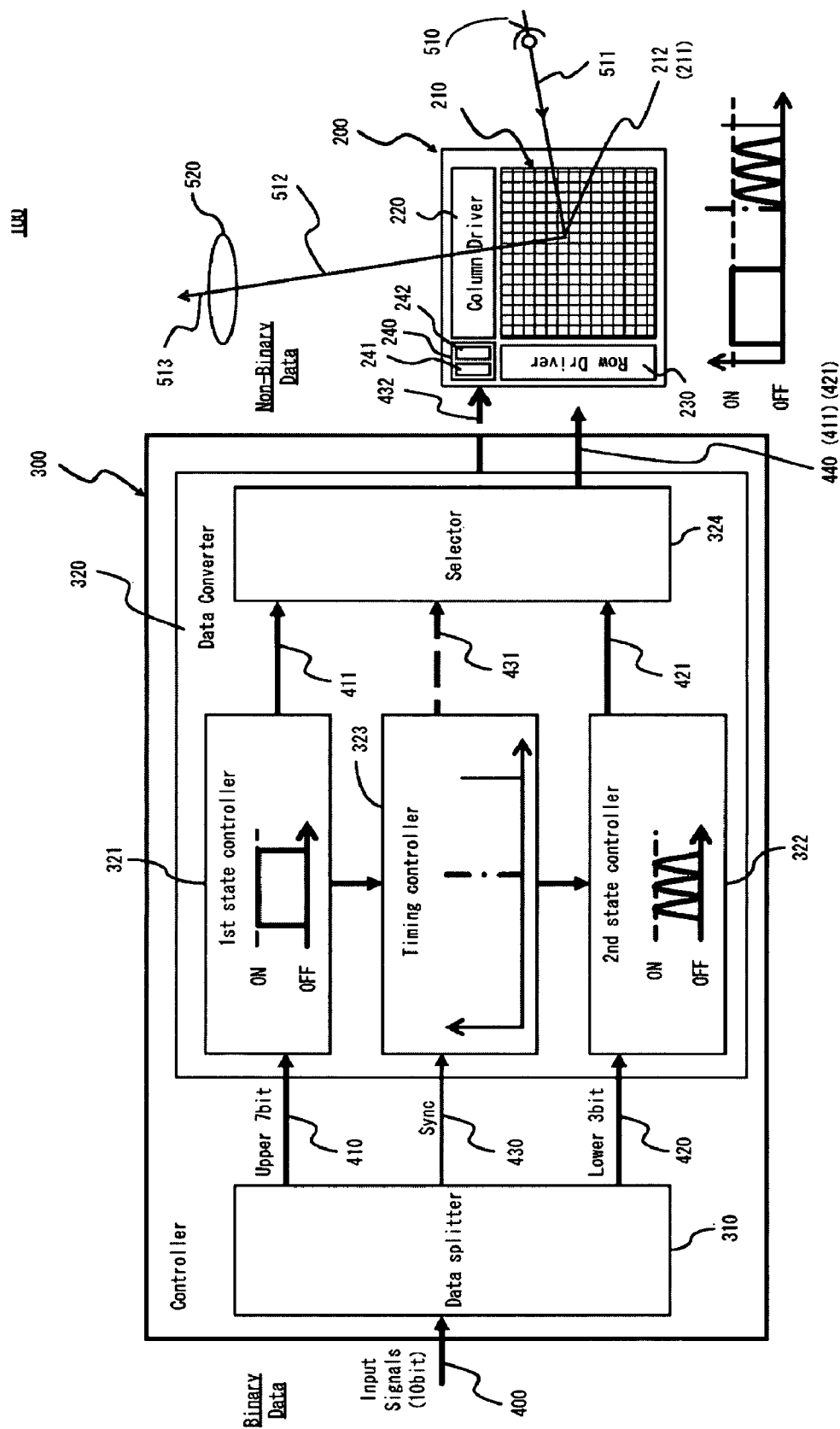
FIG. 2 is a conceptual diagram showing an example of configuration of a display system according to a preferred embodiment of the present invention.
Figure 3:
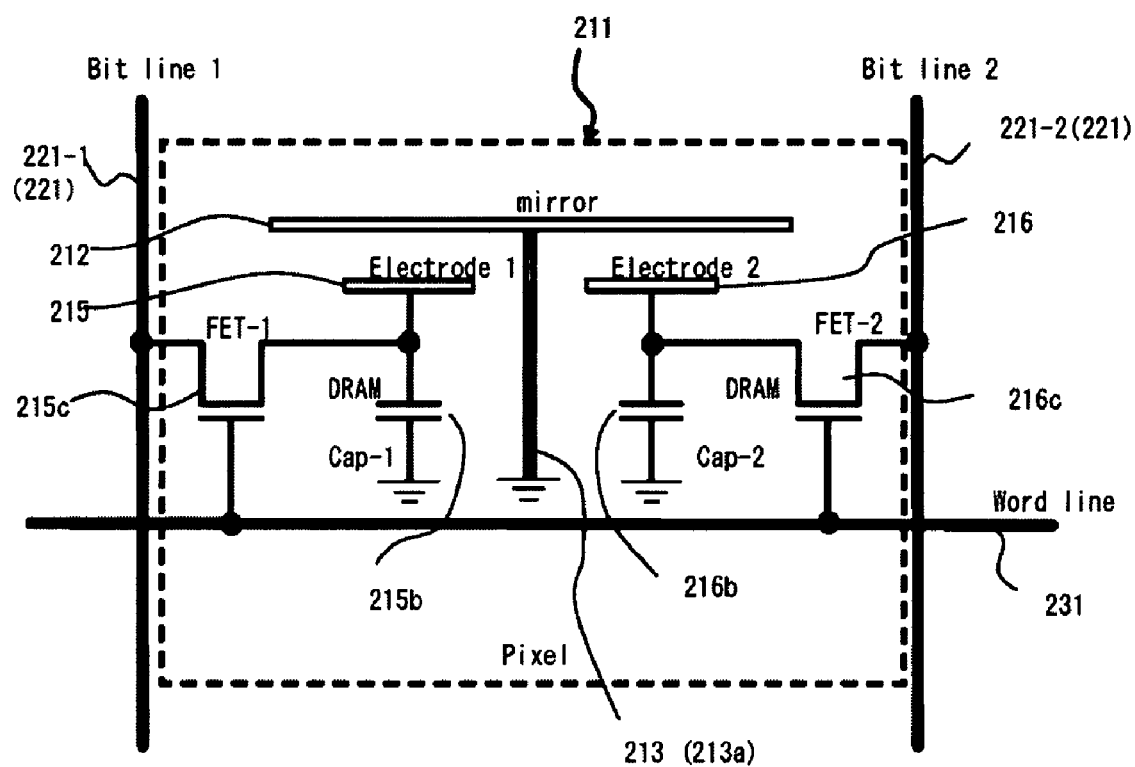
FIG. 3 is a conceptual diagram exemplifying a configuration of a pixel unit 211 constituting a spatial light modulation element according to a preferred embodiment of the present invention.

FIG. 2 is a functional block diagram for showing an exemplary configuration of a display system of the present invention. FIG. 3 depicts a cross sectional view of a pixel unit 211 constituting a spatial light modulation element according to a preferred embodiment of the present invention.

Referring to FIG. 2 for a display system 100 that includes a control system 300. The display system 100 further includes a micromirror array that has a plurality of micromirrors. The display control system 300 controls the micromirrors 212 in a first state and in a second state. The display system further implements a switchover control function for switching from a first state to a second state or from the second state to the first state wherein the switchover control function switches the states of mirrors at a predetermined point within a frame period as shown in FIGS. 4A and 4B, FIGS. 5A and 5B, and FIGS. 6A and 6B. Furthermore in a preferred embodiment, the switchover control function switches the states of plural mirrors at a predetermined point within a frame period.

The system as shown in FIG. 2 has the advantage that it reduces the burden of the processor to process the signals when two different methods of modulation and control time slot are used sequentially in a single frame period, it is necessary to calculate the time to use the two methods and the timing to change for each pixel. This invention enables a reduction in the burden of signal processing for a mirror control by setting up fixed timing. In this invention, the processor can calculate only the time to implement the two control methods equally for plural pixels within the predetermined two time portions divided for a control shift in a frame and the time of signal process can be reduced. As exemplified in FIG. 2, the display system 100 according to the present embodiment comprises a spatial light modulation element 200, a control apparatus 300, a light source 510 and a projection optical system 520.

As exemplified in FIG. 3, et cetera, the spatial light modulation element 200 according to the present embodiment comprises a pixel array 210, a column driver 220, a row driver 230 and an external interface unit 240. The pixel array 210 is featured with a bit line 221 vertically extended from the column driver 220 and with a plurality of pixel units 211 being arrayed like a grid at each of the positions crossing a word line 231 horizontally extended from the row driver 230.

As exemplified in FIGS. 3, 4A, 5A and 6A each of the pixel units 211 comprises a micromirror 212 supported on a hinge 213 formed on a substrate and allowed to swing freely with different inclined angles relative to the hinge 213 extended substantially perpendicular from the substrate 214. A hinge electrode 213a includes an OFF electrode 215 and an OFF stopper 215a, and an ON electrode 216 and an ON stopper 216a disposed on the substrate 214 symmetrical to the hinge 213. The OFF electrode 215 attracts the micromirror 212 with a coulomb force and for swinging to a position to contact with the OFF stopper 215a when a predetermined voltage is applied to the OFF electrode 215. An incident light 511 projected to the micromirror 212 is reflected to a light path along an OFF direction, which is shifted from the optical axis of a projection optical system 130. The ON electrode 216 attracts the micromirror 212 with a coulomb force and for swinging to a position to contact with the ON stopper 216a when a predetermined voltage is applied to the ON electrode 216. An incident light 511 projected to the micromirror 212 is reflected to a light path along an ON direction, which is identical with the optical axis of the projection optical system 520.

An OFF capacitor 215b is connected to the OFF electrode 215, and the OFF capacitor 215b is connected to a bit line 221-1 by way of a gate transistor 215c. And an ON capacitor 216b is connected to the ON electrode 216, and the ON capacitor 216b is connected to a bit line 221-2 by way of a gate transistor 216c. The signals inputted to the word line 231 controls the switching on and off of the gate transistor 215c and gate transistor 216c.

The horizontal row of the pixel units 211 connected to a discretionary word line 231 are simultaneously selected and a charging of capacitance to, and discharging thereof from, the ON capacitor 216b is controlled by the bit line 221-1 and bit line 221-2, thereby individually controlling the ON/OFF of the micromirror in each of the pixel units 211 within the horizontal row. The external interface unit 240 comprises a timing controller 241 and a parallel/serial interface 242. The timing controller 241 selects the horizontal row of the pixel units 211 by a signal inputted to word line 231 based on a scan timing control signal 432 outputted from a selector 324.

The parallel/serial interface 242 provides a control signal 440 to a column driver 220. The light source 510 projects the incident light 511 onto the spatial light modulation element 200 so that the reflection light 512 on the light path passing through the projection optical system 520. Then the projection light 513 is projected on a screen (not shown) for display an image.

The control apparatus 300, according to the present embodiment, controls the spatial light modulation element 200 that includes a data splitter 310 and a data converter 320. The control apparatus 300 controls the display gray scale by controlling the ON/OFF state (i.e., the ON/OFF modulation) and oscillating state (i.e., the oscillation modulation) of the micromirror 212 of the spatial light modulation element 200. The data splitter 310 performs the function of separating binary video image signal 400 that is received as input binary data 400. The binary data is separated into data 410 for controlling the micromirror 212 under an ON/OFF modulation and further into data 420 for controlling the micromirror 212 under an oscillating state. The data splitter 310 further, performs a function of outputting a synchronous signal 430 for controlling the data converter 320. The data converter 320 comprises a first state control unit 321, a second state control unit 322, a timing control unit 323 and a selector 324. The first state control unit 321 performs the function of generating a first mirror control signal 411 of non-binary data based on the separation data 410 of binary data and outputting the signal 411 to the spatial light modulation element 200 by way of the selector 324, thereby controlling the micromirror 212 in an ON/OFF state. The second state control unit 322 generates a second mirror control signal 421 of non-binary data based on the separation data 420 of binary data and outputs the signal 421 to the spatial light modulation element 200 by way of the selector 324, thereby controlling the micromirror 212 in an oscillating state.

The timing control unit 323 performs the function of controlling the first state control unit 321 and second state control unit 322. The timing control unit 323 calculates the time duration to control the micromirror 212 in an ON state within each frame corresponding to the binary video image signal 400. The timing control unit 323 further calculates the time duration to control the micromirror 212 in an oscillating state for each of the micromirrors 212 corresponding to the pixels of an image based on a synchronous signal 430 generated from the input binary video image signal 400, or on a synchronous signal input simultaneously with a video image signal). The timing control unite further performs a function of outputting a switchover control signal 431 to the selector 324.

The selector 324 selects either the first mirror control signal 411 or the second mirror control signal 421 for applying to the spatial light modulation element 200 based on the switchover control signal 431. The selector therefore switches the control of the micromirror 212 from an ON/OFF modulation control of the first state control unit 321 applying the first mirror control signal 411 over to an oscillation modulation control by selecting the second state control unit 322 applying the second mirror control signal 421, or from the oscillation modulation control over to the ON/OFF modulation control. Although the data splitter 310, data converter 320, first state control unit 321, second state control unit 322, timing control unit 323 and selector 324 which are shown in the drawing as separate function units individually, all these functions may be combined and integrated as a single function unit to carry out all these functions.

Each of the pixel elements, i.e., the pixel units 211, of the spatial light modulation element 200 is a micromirror 212 controlled in one of the states, i.e., the ON/OFF state, an oscillating state or an intermediate state. The present embodiment is configured to control the ON/OFF state by the first mirror control signal 411 from the first state control unit 321 and the oscillating state and intermediate state controlled by the second mirror control signal 421 from the second state control unit 322. The spatial light modulation element 200 carries out a light intensity (i.e., an intensity of light) modulation according to the length of interval of the first mirror control signal 411 and second mirror control signal 421, and further based on a control timing requirement according to an arithmetic logical operation.

The following description describes the basic control of the micromirror 212 of the spatial light modulation element 200 according to the present embodiment. A function defined by Va(1,0) represents an application of a predetermined voltage Va to the OFF electrode 215 and in the meantime the ON electrode 216 is left open without applying a definite voltage thereon. On the other hand a voltage function defined by Va (0,1) represents that no voltage is to the OFF electrode 215 and a voltage Va is applied to the ON electrode 216. Furthermore, a voltage function defined by Va (0,0) represents that there is no voltage to the OFF electrode 215 or ON electrode 216 and Va (1,1) represent a high voltage is applied to both of the OFF electrode 215 and ON electrode 216.

Figure 4B:
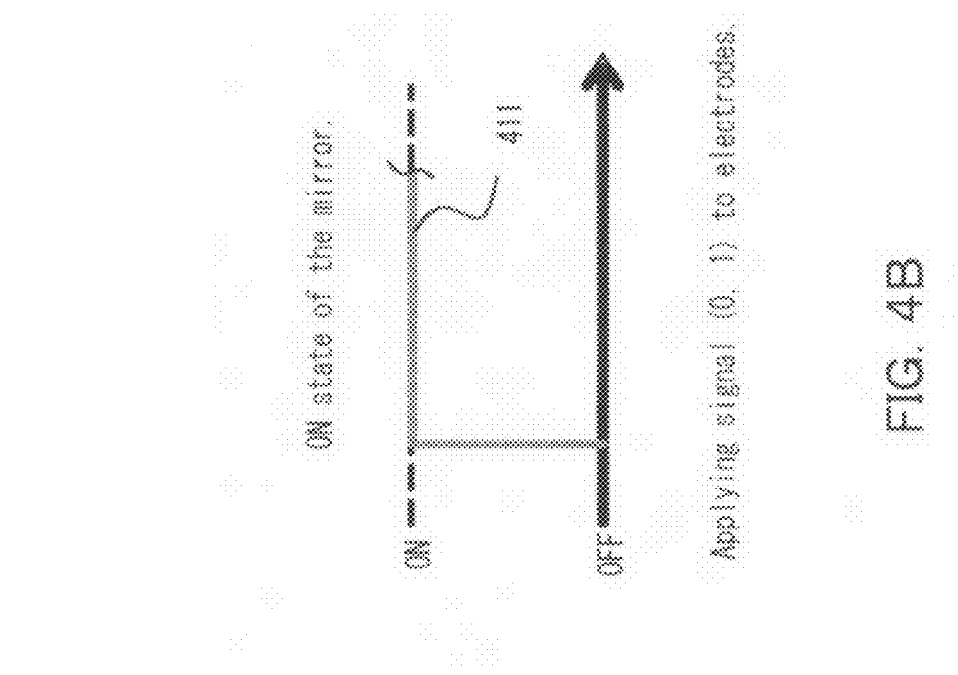
FIG. 4B is a line diagram showing an intensity of light obtained in an ON state of a micromirror.
Figure 4A:
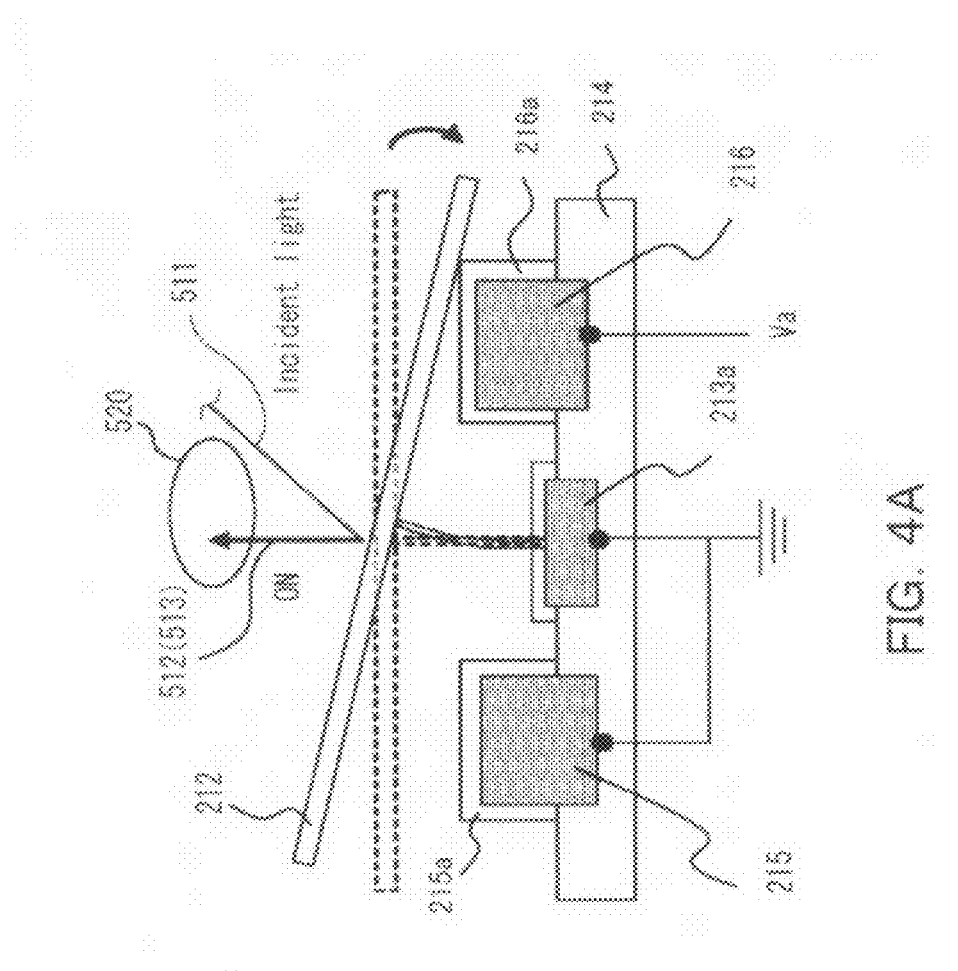
FIG. 4A is a description diagram showing an ON state of a micromirror.

FIGS. 4A, 4B, 5A, 5B, 6A and 6B show a configuration of the pixel unit 211 includes the micromirror 212, hinge 213, OFF electrode 215 and ON electrode 216. These figures further illustrate control of the micromirrors 212 in an ON/OFF state and under an oscillation state. FIG. 4A shows the control of the micromirror 212 to swing from a neutral state when a voltage is applied on the ON electrode 216. The predetermined voltage is represented by Va (0,1) applied only to the ON electrode 216. In the ON state of the micromirror 212, the reflection light 512 is transmitted through the projection optical system 520 and as an image projection light 513. FIG. 4B shows the intensity of light projected in the ON state.

FIG. 5A shows the control of the micromirror 212 to swing from the neutral state when a voltage is applied on the OFF electrode 215. The predetermined voltage Va (1,0) is applied only to the OFF electrode 215. In the OFF state of the micromirror 212, the reflection light 512 is deflected away from the projection optical system 520, thus deviates from the light path of the projection light 513. FIG. 5B shows the intensity of light projected in the OFF state.

Figure 6B:
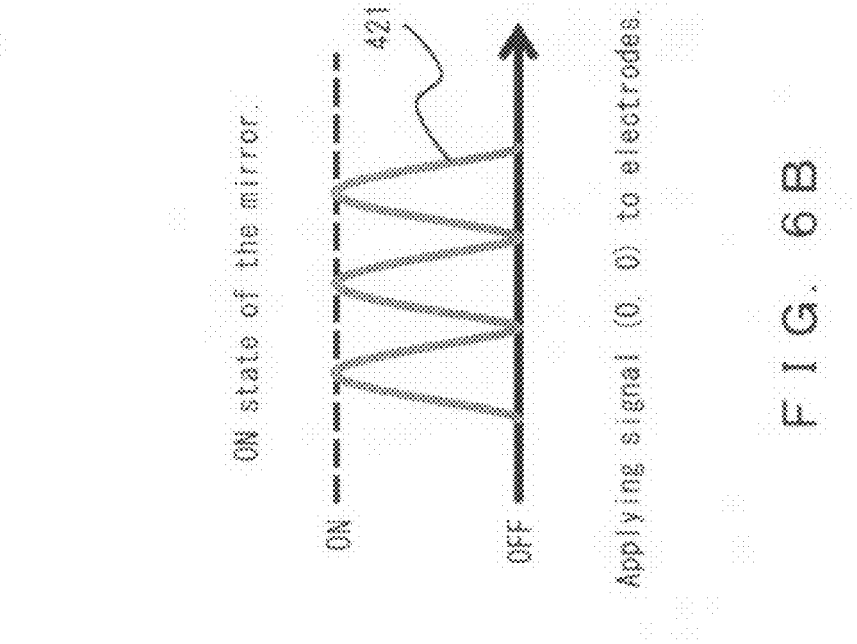
FIG. 6B is a line diagram showing an intensity of light obtained in an oscillating state of a micromirror.
Figure 6A:
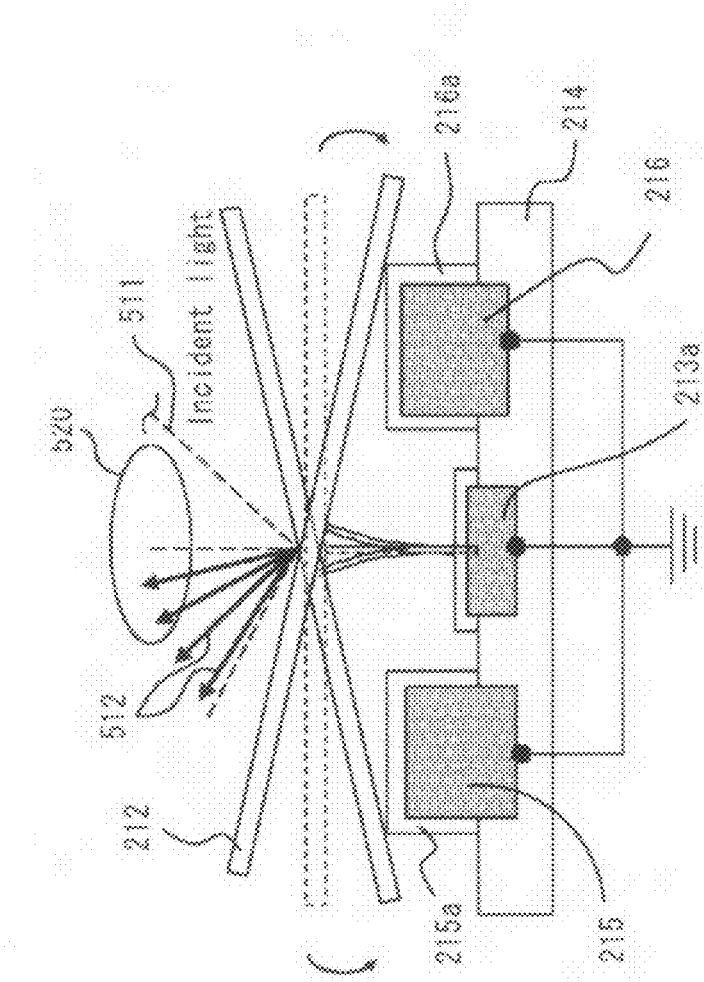
FIG. 6A is a description diagram showing an oscillating state of a micromirror.

FIG. 6A exemplifies the optical projection of the micromirror 212 when the micromirrors is controlled to have a free oscillation with a maximum amplitude of A0 between an angular position (i.e., a Full ON) when the micromirror is contacting with the ON electrode 216 and another angular position (i.e., a Full OFF) contacting with the OFF electrode 215. An incident light 511 is projected on the micromirror 212 at a prescribed angle. The intensity of reflecting light when the mirror is at the ON direction and a part of the intensity of light (i.e. the intensity of light of the reflection light 512) reflecting to the middle of the ON direction and OFF direction are incident to the projection optical system 520. The brightness of the image, i.e., the projection light 513 is shown in FIG. 6B of an intensity of light when the micromirror 212 is controlled in an oscillating state. As illustrated in FIG. 4A, when the micromirror 212 is operated in an ON state, the reflecting light 512 is reflected to an ON direction and projected to the optical system 520 as the projection light 513. As illustrated in FIG. 5A, when the micromirror 212 is operated in an OFF state, the reflecting light 512 is reflected to an OFF direction and projected away the optical system 520 deviates from the optical path of the projection light 513.

As illustrated in FIG. 6A, when the micromirror 212 is operated in an oscillating state, apart of the light flux of the reflection light 512, diffraction light, diffusion light and the like are reflected to the projection optical system 520 and projected as a projection light 513 and the intensify of the projection light changes temporally.

Note that the examples shown in FIGS. 4A, 4B, 5A, 5B, 6A and 6B described above, a voltage Va that is represented by a binary value of 0 or 1 is applied to either the OFF electrode 215 or the ON electrode 216. Alternatively, a more minute control of a swinging angle of the micromirror 212 is achieved by increasing the steps of coulomb force generated between the OFF electrode 215 and ON electrode 216 and further by increasing the step of the voltage value Va to multiple values. Also note that the examples shown in FIGS. 4A, 4B, 5A, 5B, 6A and 6B described above, the micromirror 212, i.e., the hinge electrode 213a is controlled at the ground potential; alternatively, a more minute control of a swinging angle of the micromirror 212 is achieved by applying an offset voltage thereto is also possible.

Figure 7:
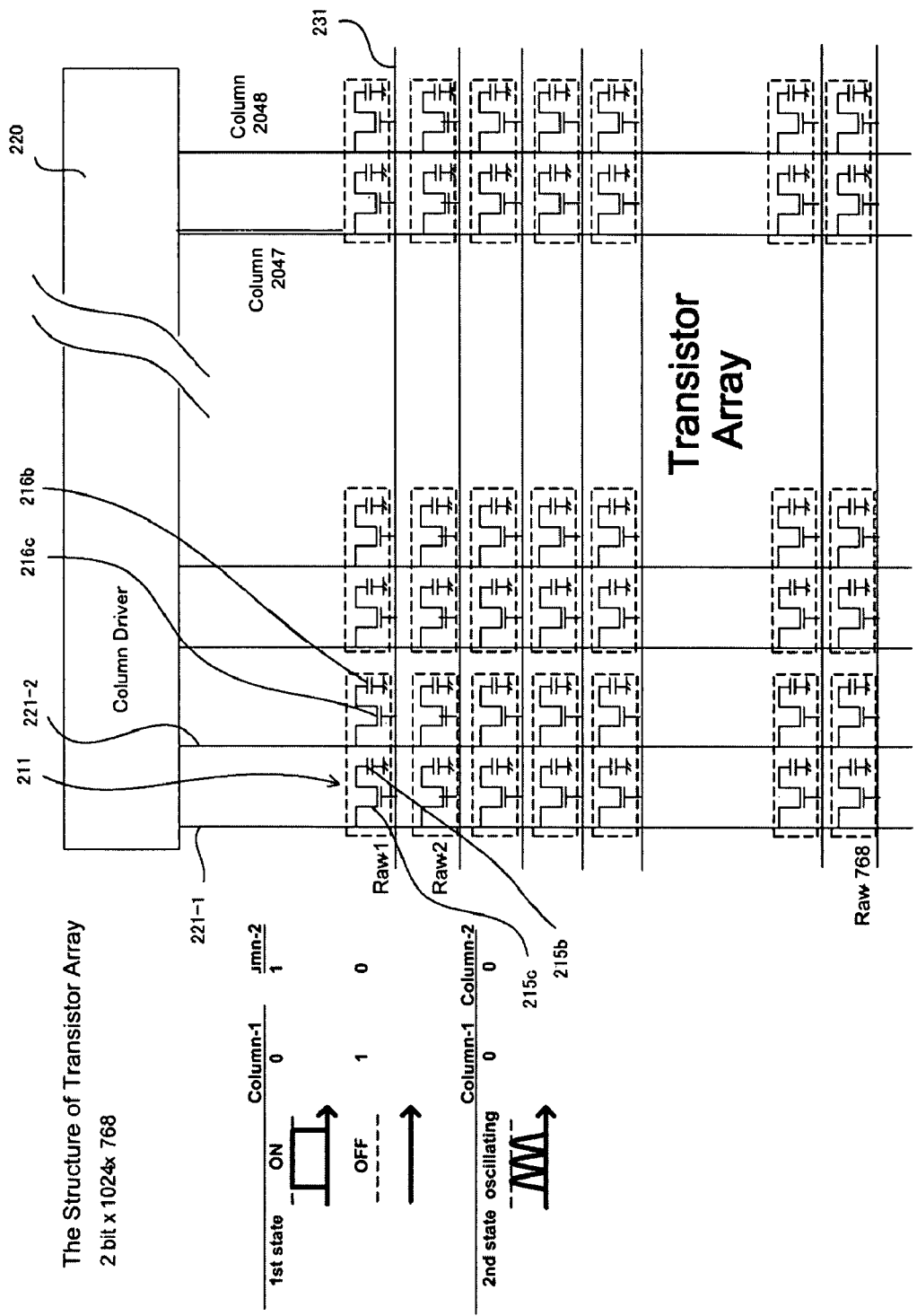
FIG. 7 is an alternate control circuit diagram for showing two transistor arrays with two columns of lines for two electrodes.

The present embodiment is configured to apply the voltages, i.e., Va (0,1), Va (1,0) and Va (0,0), at the respective appropriate timings in the middle of swinging shift of the micromirror 212 between the ON and OFF state as described below. By generating free oscillations of amplitudes A1 and A2 which are smaller than the maximum amplitude A0 between the ON and OFF states a more refined gray scale is accomplished Another advantage of such system configuration and switchover control function is that the number of column lines can be reduced to a half as that shown in FIGS. 7 and 8. FIG. 7 shows a system that has two electrodes per pixel. In this invention, two control signals are generated as output to each pixel from the column driver. The first control function uses a column line inputting a column decoder and the second control function shown in FIG. 8 uses a mode line inputting the column decoder and controls all pixels in row line simultaneously. In this exemplary embodiment, the spatial light modulation element 200 shown in FIG. 7 implements two of bit lines 221-1 and 221-2 as required respectively controlling the individual pixel units 211 are controlled by the column driver 220.

Figure 8:
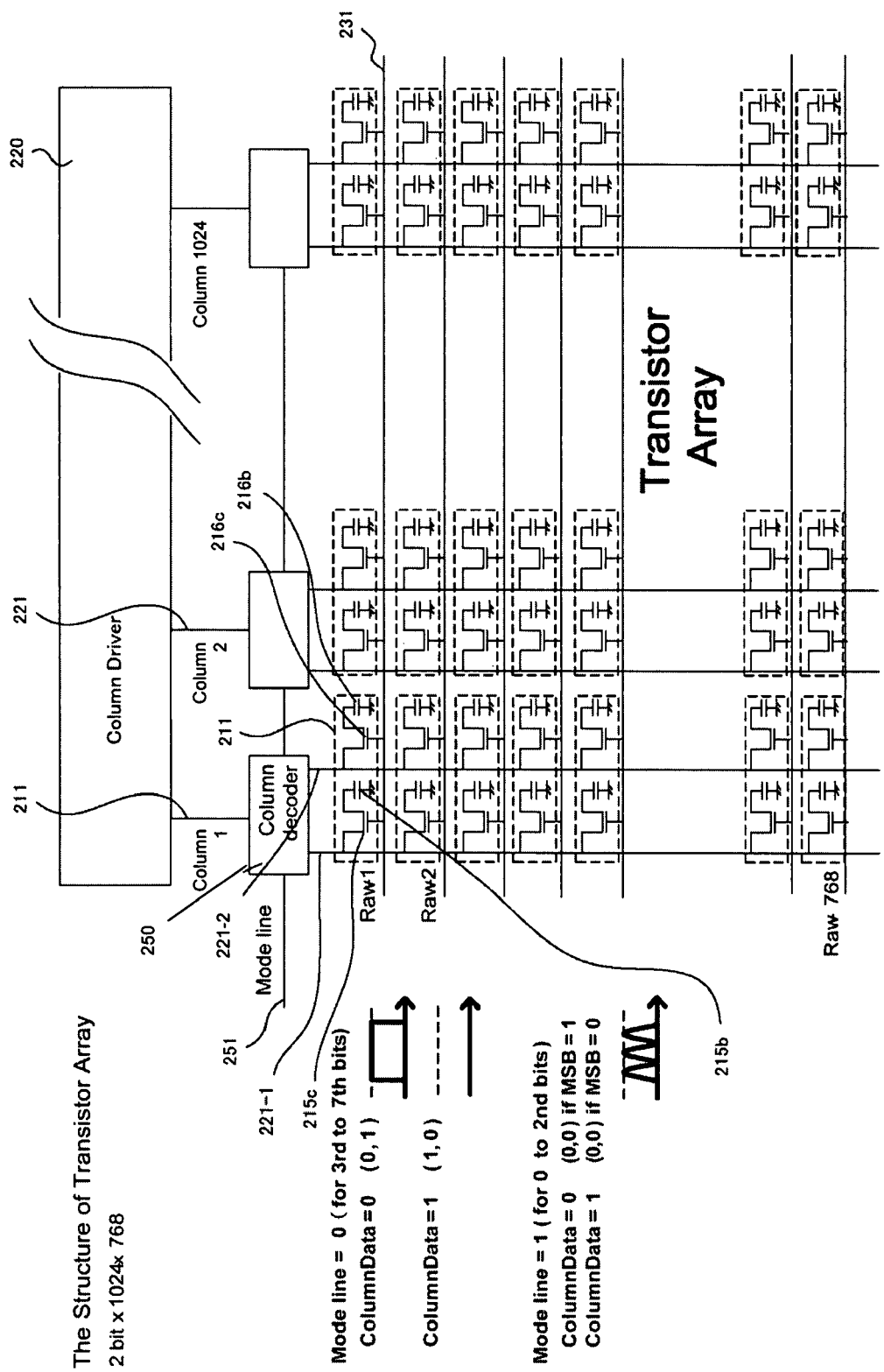
FIG. 8 is an alternate control circuit diagram for showing two transistor arrays with one column of lines for two electrodes.

Meanwhile, FIG. 8 shows another exemplary spatial light modulation element 200 wherein a column decoder 250 is equipped between the column driver 220 and each of the pixel units 211. The column decoder 250 controls the logic states of two lines, i.e., the bit line 221-1 and bit line 221-2, from one bit line 221 input from the column driver 220 to the column decoder 250 based on a mode control line 251 that is externally input. The column decoder 250 implements a bit line 221-1, bit line 221-2)=(0,1) if the bit line is "0", while a (bit line 221-1, bit line 221-2)=(1,0) if the bit line 221 is "1", when the mode control line 251 is "0" during a control period of the first mirror control signal 411.

The column decoder 250 implements a (bit line 221-1, bit line 221-2)=(0,0) for the mode control line 251 being both "0" and "1" during a control period of the second mirror control signal 421. By this, the micromirror 212 is controlled by using the first mirror control signal 411 and third mirror control signal 422. The configuration of FIG. 8 provides the benefit that it possible to reduce the number of bit lines controlled by the column driver 220 to a half of the number for the configuration of FIG. 7. The spatial light modulation element 200 of the display system 100 according to the present embodiment can be configured either according to the configurations shown above either as that shown in FIG. 7 or FIG. 8.

Figure 9:
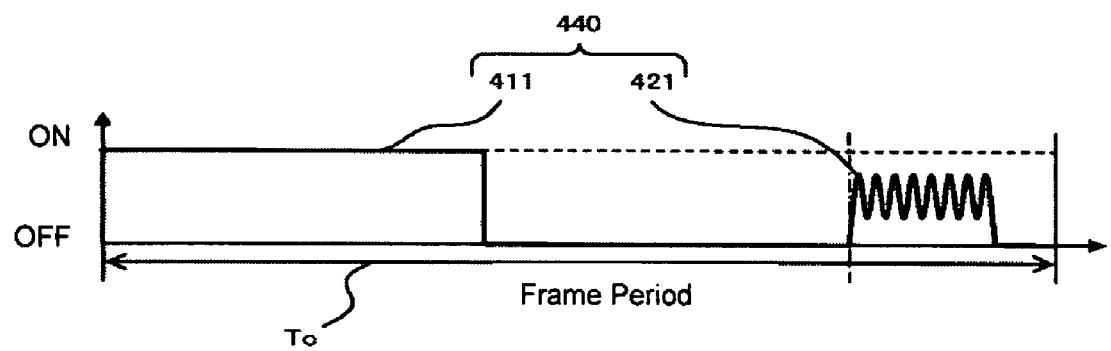
FIG. 9 is a diagram for showing the modulation timing-diagram implemented in a controller.

Referring to FIG. 9 for a timing diagram of a control system wherein the control system controls the micromirrors of the SLM at the first state comprises an ON state and an OFF state of mirror, and the second state comprises the state controlled in a state positioned between the ON and OFF or an oscillating state. The system with such control scheme has an advantage that it enables higher grade of grayscale than the system having only the first state by adding lower intensity of light with the second state. Therefore, the control scheme of FIG. 9 combines a modulation control signal 440 with the first mirror control signal 411 for controlling the ON/OFF of the micromirror 212 and the second mirror control signal 421 for controlling the oscillation of the micromirror 212. A more refined scales of controllable light intensity is accomplished and hence obtaining a higher grade of gray scale as compared to the case of a mere ON/OFF control.

Figure 10:
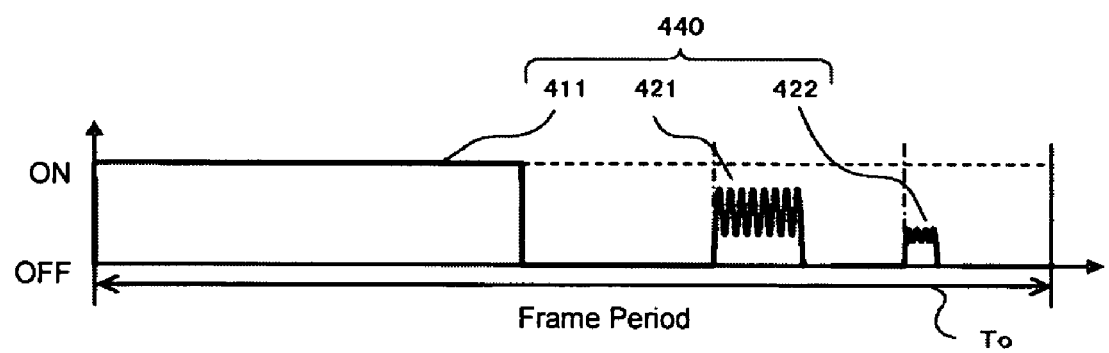
FIG. 10 is a diagram for showing another modulation timing-diagram implemented in a controller.

Referring to FIG. 10 for another control method implemented in a system that has a third control function for switching to a third state. The control function implemented in the display system is for switching a micromirror from the second state to the third state or from the third state to second state. The control function is further implemented for switching from the first state to third state or from the third state to first state. The control function is also implemented for switching the states of multiple pixels simultaneously at the determined location in a frame. The display system provides an additional advantage of enabling a higher number of gray scales. The third state adds a lower amount of controllable light intensity. The display system with controllable light intensity as shown in FIG. 10 can achieve greater number of grayscales by combining the first, second and third states. According to FIG. 10, an additional modulation control by controlling the micromirror 212 to oscillate in smaller amplitude than the second mirror control signal 421, in addition to the first mirror control signal 411 and second mirror control signal 421.

Figure 11:
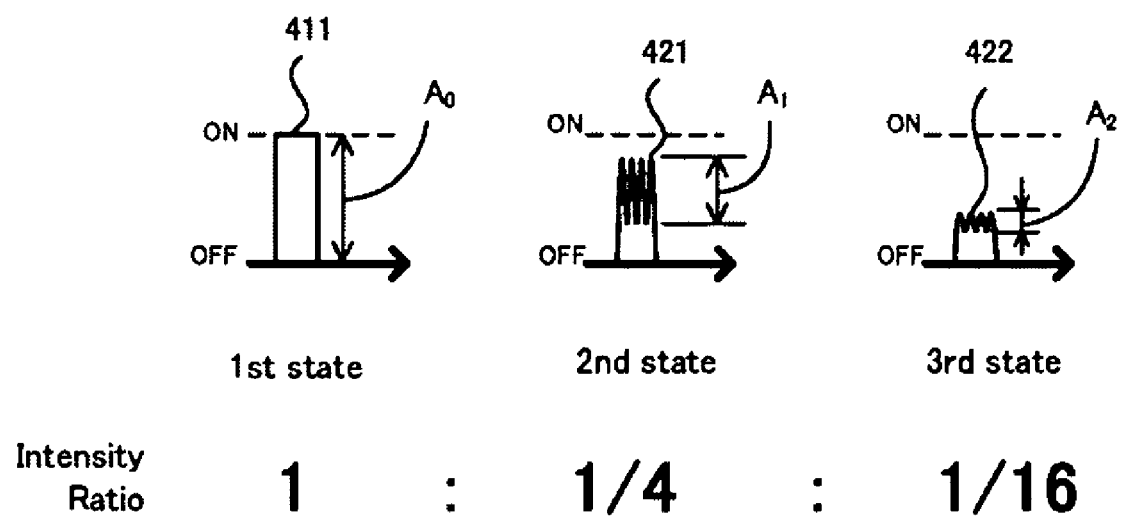
FIG. 11 is a line diagram exemplifying an implementation of an oscillating state of a micromirror in a display system according to an embodiment of the present invention.

FIG. 11 is a control-timing diagram for showing the micromirror are controlled to operate in a first state, a second state and a third state, and the light intensity ratio of the minimum control unit when the same incident light is applied. If the control of the first state provides 256 levels of grayscale, the system combining the control of the second state provides 1024 levels of grayscale. Furthermore, the system combining the control of the third state provides 4096 levels of grayscale. According to FIG. 11 a greater number of gray scales are achieved when the modulation control as shown is applied.

FIG. 11 shows a control method based on the method shown in FIG. 10 described above and also controls the intensity of light of a projection light 513 by adjusting an oscillation time T of the micromirror 212 to be approximately a quarter (¼), and one sixteenth (¹⁄₁₆) of the light intensity obtained by holding the micromirror in an ON state for the same time length. Specifically, a light intensity ratio of approximately ¼ is accomplished by setting the amplitude A of oscillation of the micromirror 212 at amplitude A1 (e.g., 50%) with respect to the maximum amplitude A0. And a light intensity ration of approximately ¹⁄₁₆ is accomplished by setting the amplitude A of oscillation of the micromirror 212 at amplitude A2 (e.g., 25%) with respect to the maximum amplitude A0. A gray scale of 256-level is displayed by changing the time for controlling an ON state within one frame of the displayed video image. A combination of the aforementioned control with additional control by adjusting the oscillation in the amplitude A1 (i.e., the first state) makes it possible to display a gray scale of a 1024-level. Furthermore, a combination of a free oscillation state between the ON state (i.e., the first control state), amplitude A1 (i.e., the second control state) and amplitude A2 (i.e., the third control state) makes it possible to create a gray scale of a 4096-level.

Figure 12:
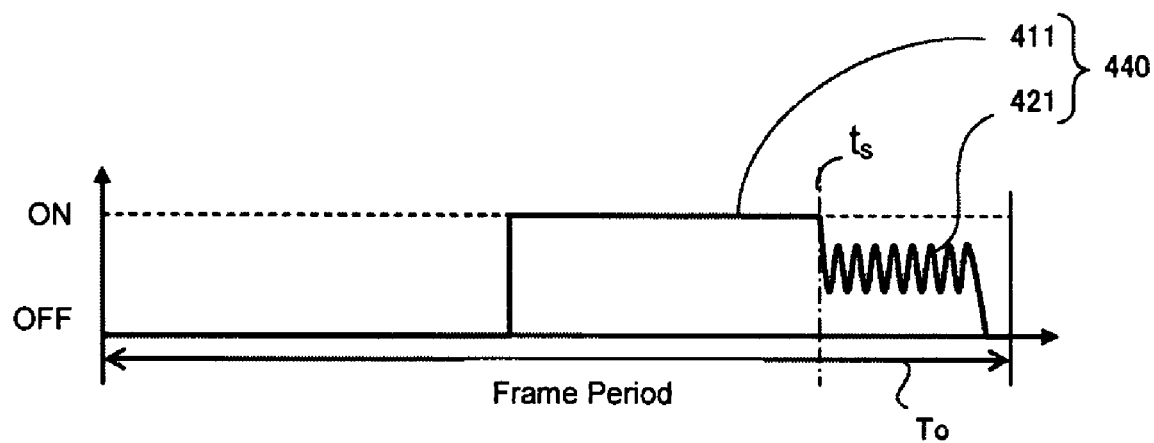
FIG. 12 is a diagram for showing another modulation timing-diagram implemented in a controller mirrors that are controlled to the first state, followed by being switched to the second state sequentially at a predetermined point without becoming an OFF state.

FIG. 12 shows another example of a modulation control signal 440 according to another embodiment. In FIG. 12 the modulation control signal 440 includes a first mirror control signal 411 and a second mirror control signal 421 next to each other across a switchover clock time ts. A control method is implemented in a system wherein the mirrors are controlled in the first state and then switched to the second state sequentially at a predetermined point without shifting to an OFF state. The control method has several advantages. The calculation process can be reduced because this method eliminates one control of mirror in an OFF state per frame. The mirror life is extended because this eliminates one control of mirror in an OFF state per frame. The artifact of the periphery of movement objects (false contours) is reduced because the timing of turning adjacent pixels to an ON state is synchronized.

Figure 13:
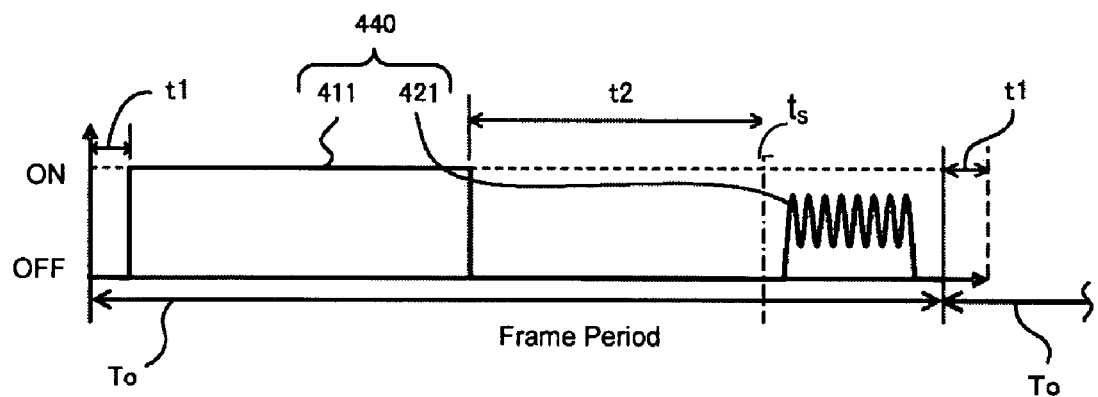
FIG. 13 is a diagram for showing another modulation timing-diagram implemented in a controller wherein there is OFF state between the first state and second state.

FIG. 13 illustrates another control method for controlling the mirror modulation in a display system. The control system controls a duration of an OFF state between the first and second state. This control method has an advantage that allows the controller a longer processing time to control the second state thus providing a higher accuracy for controlling the mirror modulation. According to FIG. 13 another modulation control signal 440 is applied. The modulation control signal as shown includes a first mirror state control signal 411 and the application of this first mirror state control signal is delayed by a time t1 after the display frame represent by T0 has started. There is also a time delay t2 between the applications of a second mirror state control signal 421 after the first mirror state control signal 411 has ended. Accordingly, a start delay time t1 that is applied from the end clock time of the second mirror control signal 421 may be related to a flexible frame display period adjustable to synchronize to the start clock time of the first mirror control signal 411 belonging to the next frame display period. By placing a start delay time t1 in the beginning of one frame display period represented by T0, providing the benefit of allowing additional process time by at least the start delay time t1, to process the first mirror control signal 411 in the next frame display period immediately following the second mirror control signal 421. Also, with an interval time t2 between the first mirror control signal 411 and second mirror control signal 421 within a display frame period T0 makes it possible to allow a process time for the succeeding second mirror control signal 421 as well.

Figure 14:
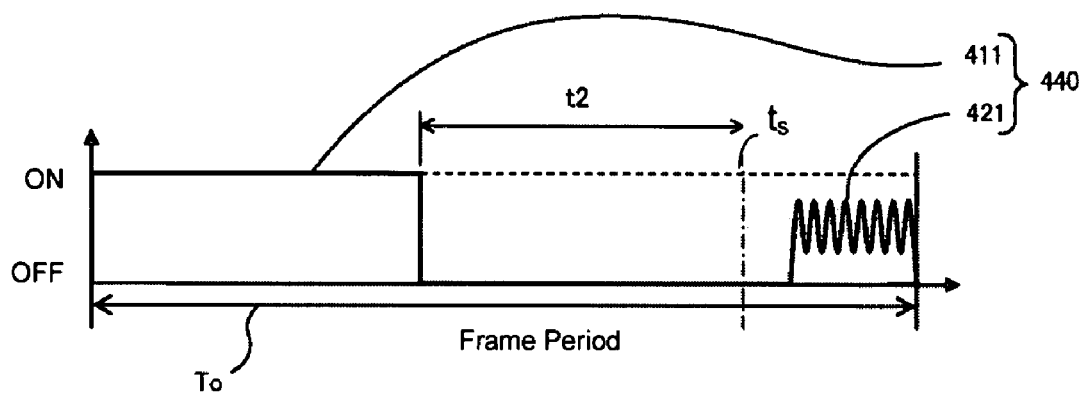
FIG. 14 is a diagram for showing another modulation timing-diagram implemented in a controller wherein the first state is located at the beginning of a frame and the second state is located at the end of the frame.

FIG. 14 illustrates another mirror modulation control method implemented in a display system. The control system controls a first state at the beginning of a frame and the second state at the end of the frame. This control method has several advantages. The calculation process is reduced because an OFF state of mirror is eliminated in each display frame. The mirror life is extended because of the elimination of the OFF control state in each display frame. The artifact of the periphery of movement objects (false contours) is reduced because the timing to turn ON adjacent pixels is synchronized. The artifact of the periphery of movement objects (false contours) is reduced because the timing to turn ON adjacent frames is synchronized. According to FIG. 14, the modulation control signal includes a variable interval time t2 is placed between the first mirror control signal 411 and second mirror control signal 421 within one frame display period T0. The start clock time of the first mirror control signal 411 match with that of one frame display period T0, and the end clock time of the second mirror control signal 421 match with the end of the one frame display period T0. This makes a state when the first mirror control signal 411 and second mirror control signal 421 within an arbitrarily selected frame display period T0 are generated continuously with the respective second mirror control signals 421 and first mirror control signals 411 in the following frame display period T0 in a sequential frame-by-frame manner. As a result, is the same benefits are achieved as in the control modulation implemented in the above-described FIG. 12.

Figure 15:
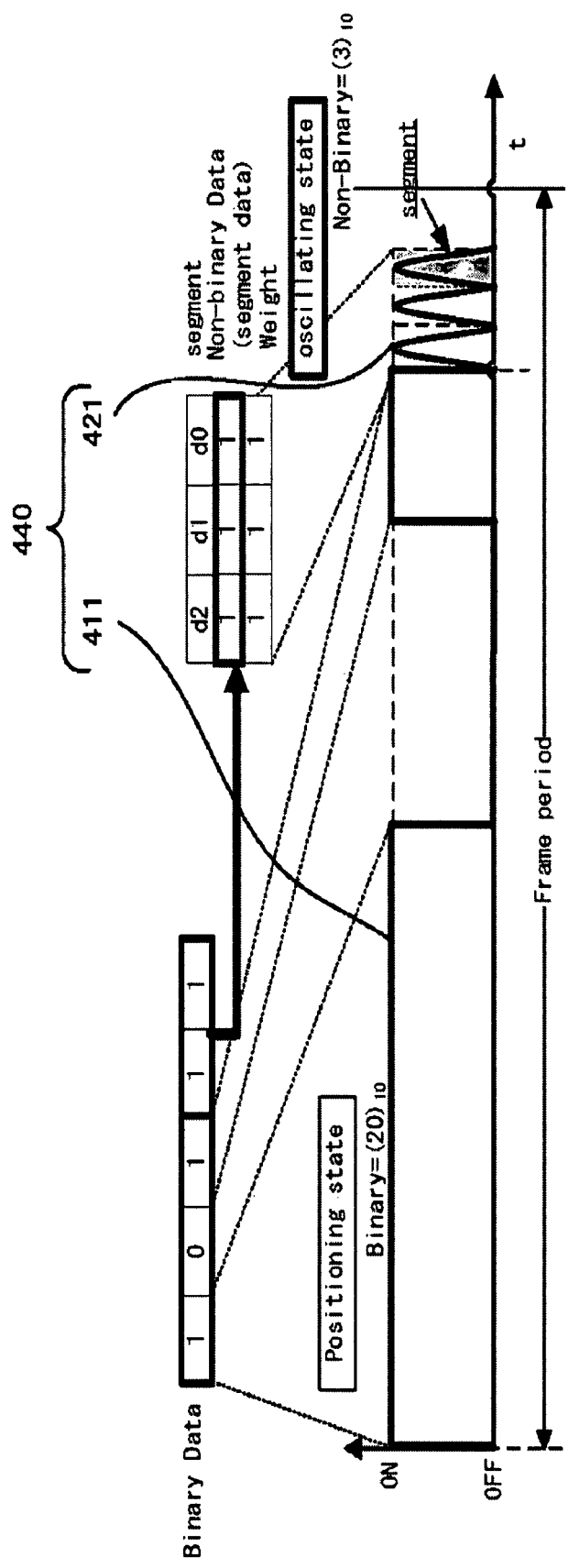
FIG. 15 is a diagram for showing a control method implemented in a controller wherein at least the second state is controlled by non-binary data.

Referring to FIG. 15 that illustrates another mirror modulation control method wherein at least the second state is controlled by a non-binary data. The control method provides a special advantage that the mirror is controlled independently from the weighting factors applying to the bits according to rules of applying the binary data for modulation control. According to FIG. 15, the modulation control signal 440 exemplifies a case of generating a first mirror control signal 411 of a PWM by binary data corresponding the upper three bits of a five-bit binary video image signal 400 and generating a second mirror control signal 421 of non-binary data by using the lower two bits. The second mirror control signal 421 generated as non-binary data by converting the lower two bits of the binary data into a decimal number and generating a bit string by applying a same weighting factor, e.g., a weighting factor of the LSB of the binary data, to each individual bits for the decimal number.

Figure 16:
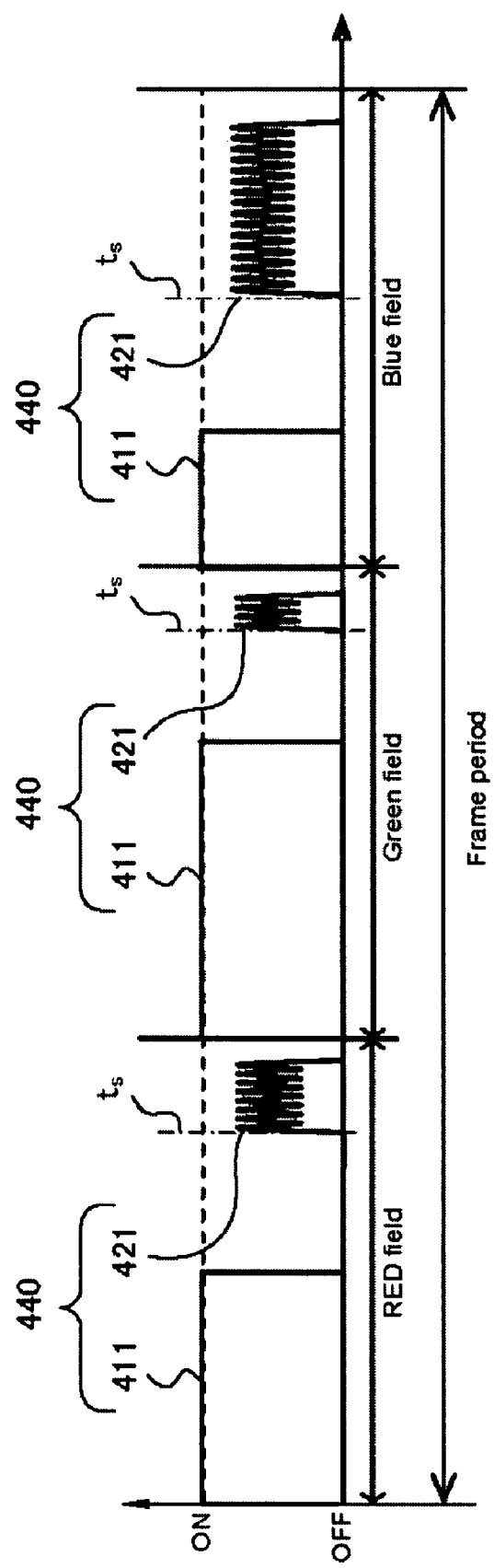
FIG. 16 is a diagram for showing another modulation timing-diagram implemented in a controller wherein the control function for switching can switch simultaneously the states of multiple pixels from the first state to the second state or from the second state to the first state at least at two determined locations in a frame.

Referring to FIG. 16 for a display system that implements another modulation control method wherein the control function for switching the control states is implemented to simultaneously switch the states of multiple pixels from the first state to second state or from the second state to first state. The simultaneous switch of states may take place on at least at two predetermined times in a frame of display. The control method has an advantage that in a color field sequential display system, as illustrated in FIG. 17, a frame is divided into RGB (red, green and blue) fields and the states of plural pixels are switched simultaneously according to a fixed schedule. This modulation control method enables a higher grade of grayscale.

According to FIG. 17 the display system 100A exemplified a single plate system using a single spatial light modulation element 200. The display system 100A comprises a single spatial light modulation element 200, a control apparatus 300, a frame memory 301, a light source drive circuit 302, a color wheel motor drive circuit 303, a light source 510 and a color wheel 510*a*. An incident light 511 projected to the spatial light modulation element 200 from the light source 510 is projected according to a time sequential manner in three primary colors, i.e., R, G, and B, within one frame display period T0 by implementing a color wheel 510*a* before the light is projected, to the spatial light modulation element 200. One frame of display period T0 is equally divided into respective fields in the order of R, G and B, and the micromirror 212 is controlled by the modulation control signal 440 that includes the first mirror control signal 411 and second mirror control signal 421 within each field as illustrated in FIG. 16 as described above. This in turn makes it possible to switch the state of plural pixels from the first state (i.e., the first mirror control signal 411) about simultaneously over to second state (i.e., the second mirror control signal 421) at a preset control switchover schedule within the respective fields of R, G and B as divided within the one frame display period T0 in the display system 100A of an RGB color field sequential system.

Figure 18:
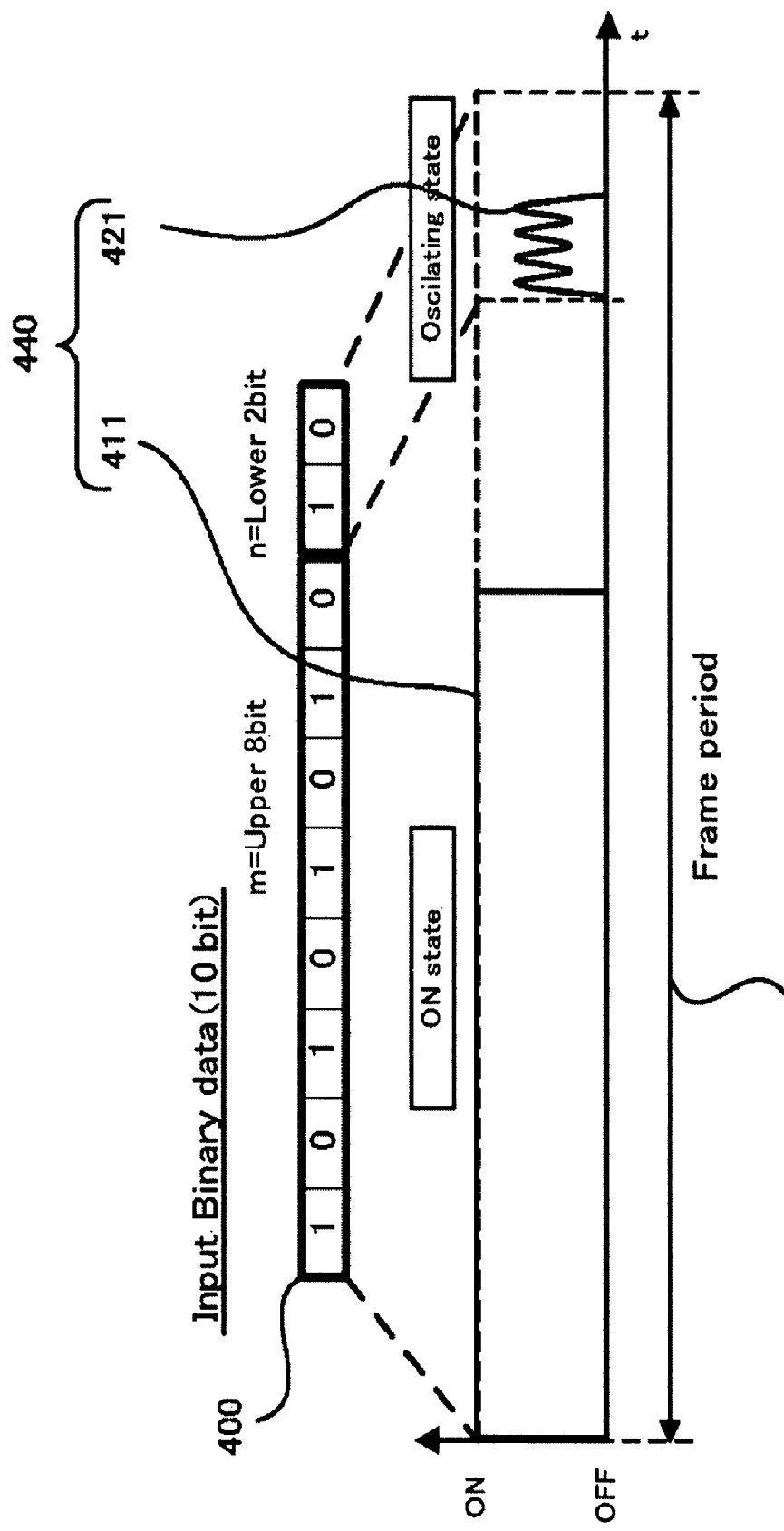
FIG. 18 is a diagram for showing a control method implemented in a controller wherein the incoming signal comprising (m+n) bit binary data is divided into upper m bits and lower n bits, with the upper m bits being controlled by the first state and the lower n bits being controlled by the second state.

Referring to FIG. 18 for a system that implements another modulation control method wherein the incoming signal comprising (m+n)-bit binary data is divided into upper m bits and lower n bits. Specifically in FIG. 18, a modulation control word is configured to allocate the upper eight bits (m=8) of the binary video image signal 400 that includes 10-bit binary data to apply as the first mirror control signal 411 and the remaining lower two bits (n=2) to apply as the second mirror control signal 421. The upper m bits are implemented to control the mirror operated at the first state and the lower n bits are implemented to control the mirror operated at the second state. The control method shown in FIG. 18 has several advantages. First, the assignment of data bits to the control function of the first state and second state are fixed, and the process of generating control signals for controlling the mirror to operate at the first and second states can be simplified. Also, the maximum of assigned data to each of the first and second states is fixed. Therefore, the switching schedules between states for plural pixels at a designated time can be easily determined.

Figure 19A:
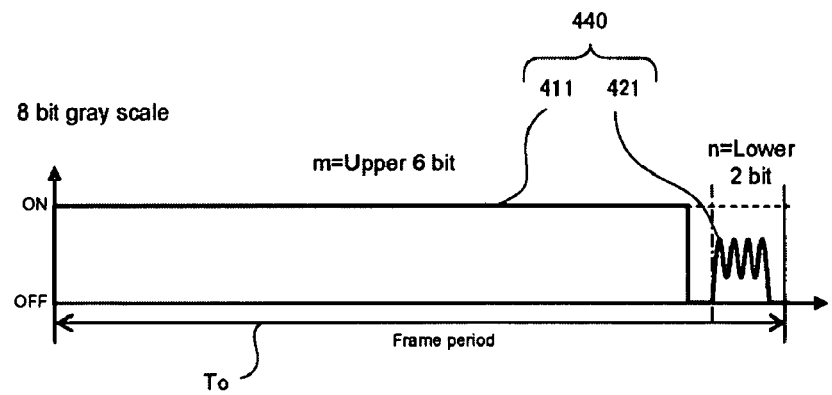
FIG. 19A is a diagram for showing another modulation timing-diagram implemented in a controller wherein the incoming signal comprising (m+n) bit binary data is divided into upper m bits and lower n bits.
Figure 19B:
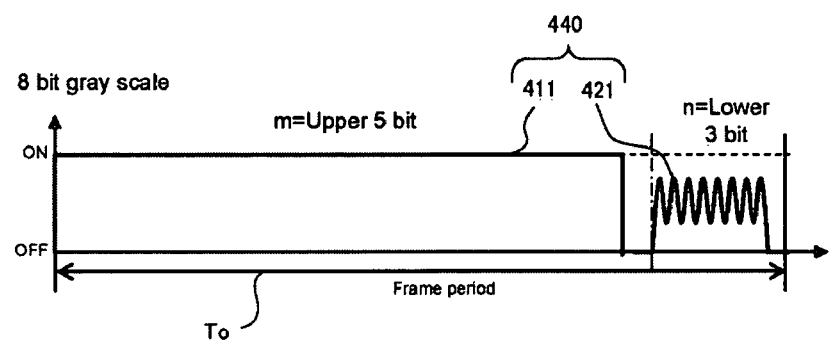
FIG. 19B is a diagram for showing another modulation timing-diagram implemented in a controller wherein the incoming signal comprising (m+n) bit binary data is divided into upper m bits and lower n bits.
Figure 19C:
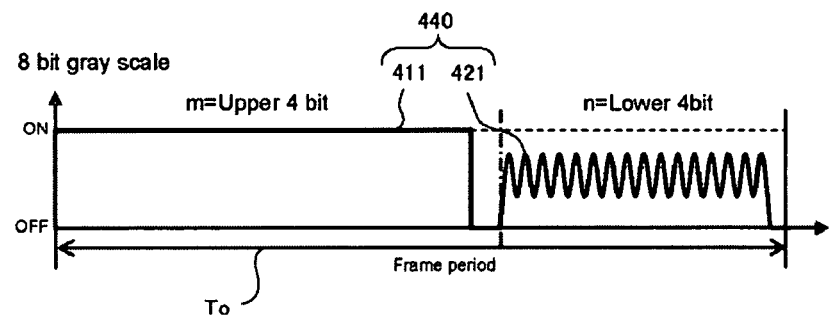
FIG. 19C is a diagram for showing another modulation timing-diagram implemented in a controller wherein the incoming signal comprising (m+n) bit binary data is divided into upper m bits and lower n bits.

Referring to FIGS. 19A, 19B and 19C for a system that implements another modulation control method wherein the incoming signal comprising (m+n)-bit binary data is divided into upper m bits and lower n bits. The upper m bits are implemented to control the mirror operated at the first state and the lower n bits are implemented to control the mirror operated at the second state. The ratio of m and n can be changed. The control method as shown in FIGS. 19A, 19B and 19C has several advantages. First, the number of bits assigned to control the mirror to operate in the first state can be reduced, and the LSB of the first state has a longer duration. This enables a slower process of the first state. Also, the number of bits assigned to the first state can be increased and the time for controlling the mirror to operate in the first state is accordingly longer. This can increase the brightness of the display. When changing the numbers of bits allocated to the first mirror control signal 411 and second mirror control signal 421 as in the case of FIGS. 19A, 19B and 19C, it can be carried out according to the following rule as an example. The data conversion may be carried out by shifting a part of the lowest part of the bit string that is allocated to the first mirror control signal 411 to the upper side of the second mirror control signal 421 if the highest part of the bit string allocated to the second mirror control signal 421 is "0". According to such process, the m-bit of the first mirror control signal 411 and the n-bit of the second mirror control signal 421 are changed by shifting between the lowest part of the first mirror control signal 411 and a first non-zero bit to the upper part of the second mirror control signal 421. By carrying out the shifting process, a change of the numbers of bits allocated to the first mirror control signal 411 and second mirror control signal 421 makes it possible to change effectively the relationship between a brightness as that controllable by the first mirror control signal 411 relative to the brightness as that controllable by the second mirror control signal 421.

FIG. 19A exemplifies a case of allocating six bits to the first mirror control signal 411 and two bits to the second mirror control signal 421 when a binary video image signal 400 is an eight-bit gray scale. Likewise, FIG. 19B exemplifies a case of allocating five bits to the first mirror control signal 411 and three bits to the second mirror control signal 421. Similarly, FIG. 19C exemplifies a case of allocating four bits to the first mirror control signal 411 and four bits to the second mirror control signal 421. The exemplary embodiments illustrates a modulation control method by dividing binary data and it is further possible to convert the input binary data into decimal data in another exemplary embodiment by applying similar processes.

Referring to FIGS. 20 through 23 for a system that implements another modulation control method wherein a control is shifted from a modulation control applying the first state to another modulation control applying the second state and wherein the shift is carried out simultaneously for plural pixels in a same display frame reduce the OFF time of the control function. Specifically in FIG. 20, the ratio of brightness controlled to display by the first mirror control signal 411 and second mirror control signal 421 of the same time duration is one to four, i.e., 1/4. Therefore, an allocation of four-unit time of the second mirror control signal 421 is in proportion to one unit time of the first mirror control signal 411. The modulation control makes it possible to change the ratio of time between the first mirror control signal 411 and second mirror control signal 421 flexibly within one frame display period T0 without changing the brightness of a pixel(s) within one frame display period T0.

Figure 20:
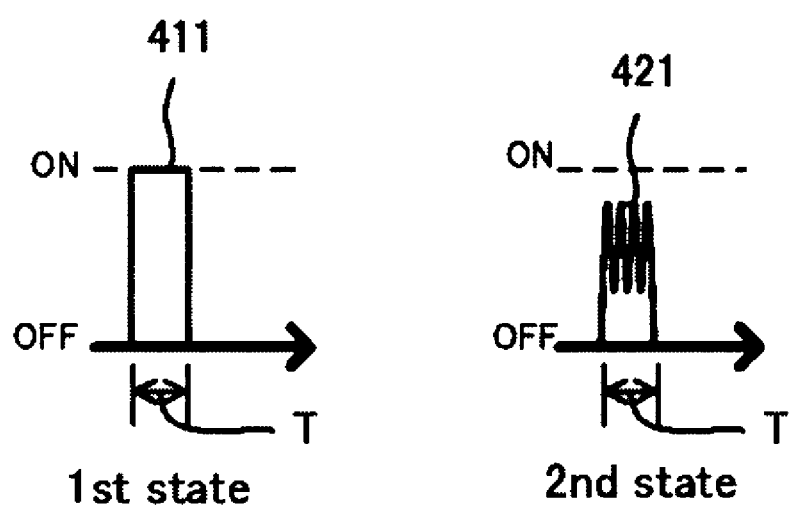
FIG. 20 is a diagram for showing another modulation timing-diagram implemented in a controller wherein the control shift from the control using the first state to the control using the second state is carried out simultaneously for plural pixels in a frame with the timing for reducing the OFF time.
Figure 21:
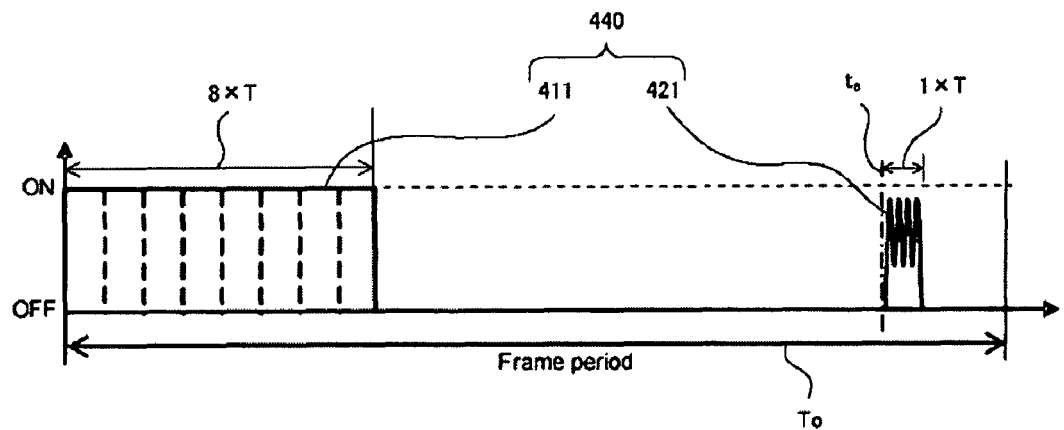
FIG. 21 is a diagram for showing a timing diagram of the brightness provided by the modulation timing-diagram implemented in a controller as shown in FIG. 20.
Figure 22:
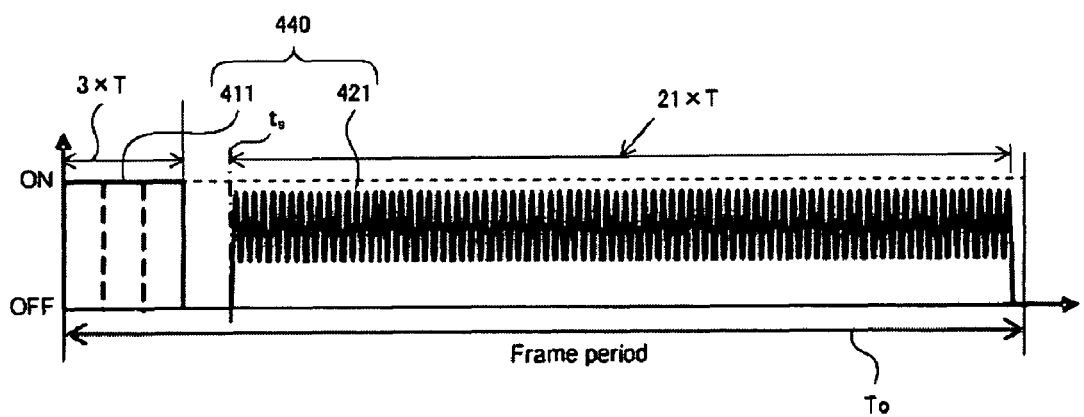
FIG. 22 is a diagram for showing a timing diagram of the converted brightest pixel in a frame or in a period of frames provided by the modulation timing-diagram implemented in a controller as shown in FIG. 20 wherein the light intensity of FIG. 21 is converted by maintaining the same brightness and the shift from the first state to the second state is carried out in the calculated timing for plural pixels simultaneously.

The control method shown in FIGS. 20 through 23 presents several advantages. First, the timings of light emitting between adjacent pixels are synchronized and the peripheral artifact of movement objects (false contours) is reduced. Also, the timings of light emitting between adjacent frames are synchronized and the peripheral artifact of movement objects (false contours) is reduced. According to the ratio of the light intensities displayed according to the first state and second state shown in FIG. 20 and the brightest pixel in a frame or in a period of frame as that illustrated in FIG. 21, the control processes can be converted into as shown in FIG. 22. The converted modulation control is allowed for maintaining the same brightness and the shift from the first state to the second state can be carried out in the calculated timing for plural pixels simultaneously. This enables a reduction of an OFF time of mirrors. The unit of time equivalent to five of the first mirror control signal 411 exemplified in FIG. 21 is converted into the unit of time equivalent to twenty of the second mirror control signal 421, thereby increasing the control period of the second mirror control signal 421 as shown in FIG. 22. Therefore, the value of the brightness of the pixels within one frame display period T0 is not changed by the conversion from the configuration of FIG. 21 into that of FIG. 22.

Figure 23:
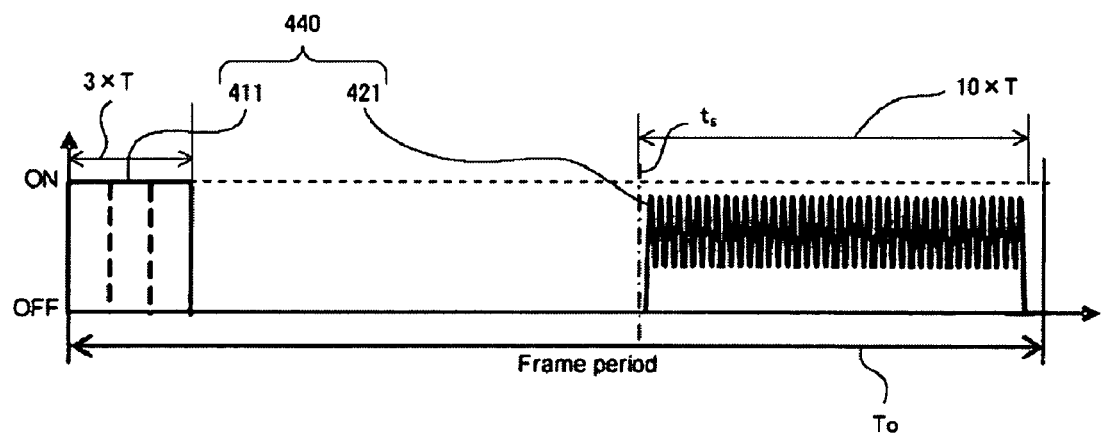
FIG. 23 is a diagram for showing a timing diagram of the brightest pixel in a frame or in a period of frames provided by the modulation timing-diagram implemented in a controller as shown in FIG. 20.
Figure 24:
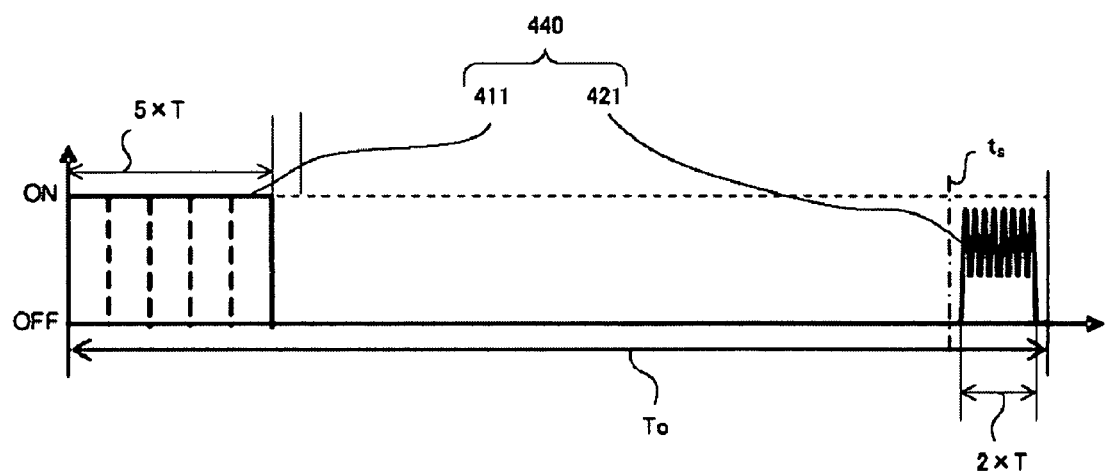
FIG. 24 is a diagram for showing a timing diagram of the converted brightest pixel in a frame or in a period of frames provided by the modulation timing-diagram implemented in a controller as shown in FIG. 20 wherein the light intensity of FIG. 23 is converted by maintaining the same brightness and the shift from the first state to the second state is carried out in the calculated timing for plural pixels simultaneously.

Referring to FIGS. 20, 23 and 24 for a system implements another modulation control method wherein the control is shifted from operating the mirror by applying the first state to operating the mirror by applying the second state. The shift is carried out simultaneously for plural pixels in a frame with the timing to reduce the ON time as determined by the control function. The control method as shown in FIG., 20, 23 and 24 has several advantages. First, the period that is required of light emitting in a frame for image display can be minimized and it reduces motion blur. Also, in the case that the light intensities of the first state and second state are controlled as that shown in FIG. 20, and the brightest pixel in a frame or in a period of frame is controlled to operate as shown in FIG. 23, the modulation control can be converted into the modulation control as shown in FIG. 24. The mirror is then controlled to operate for maintaining the same brightness and the shift from the first state to second state can be carrier out in the calculated timing for plural pixels simultaneously. This enables a reduction of the ON time of mirrors. Specifically, FIG. 23 exemplifies a case of changing the combination of three units of time (also noted as "time unit(s)" hereinafter) of the first mirror control signal 411 and ten time units of the second mirror control signal 421 to that of five time units of the first mirror control signal 411 and two time units of the second mirror control signal 421. Both of the cases of FIGS. 23 and 24 also maintain the brightness of the pixels within one frame display period T0 before and after the change of combinations.

FIG. 25 is a functional block diagram for showing a configuration of a projection apparatus according to a preferred embodiment of the present invention. A projection apparatus 5010 according the present embodiment comprises a single spatial light modulator (SLM) 5100, a control unit 5500, a total internal reflection (TIR) prism 5300, a projection optical system 5400 and a light source optical system 5200 as exemplified in FIG. 25. The projection apparatus 5010 is a so-called single-plate type projection apparatus 5010 comprising a single spatial light modulator 5100. The spatial light modulator 5100 and TIR prism 5300 are placed in the optical axis of the projection optical system 5400, and the light source optical system 5200 is placed in a manner that the optical axis thereof is in different angle from that of the projection optical system 5400. The TIR prism 5300 provides the function of making an illumination light 5600, which is incident from the light source optical system 5200 positioned on the side, incident to the spatial light modulator 5100 at a prescribed inclination angle as an incident light 5601 and also making a reflection light 5602, which is approximately vertically reflected on the spatial light modulator 5100, transmit to the projection optical system 5400.

The projection optical system 5400 projects the reflection light 5602, to transmit through the spatial light modulator 5100 and TIR prism 5300, to project to a screen 5900 or the like as a projection light 5603 for image display. The light source optical system 5200 comprises a variable light source 5210, a condenser lens 5220 for focusing the light source flux from the variable light source 5210, a rod type condenser body 5230 and a condenser lens 5240. The variable light source 5210, condenser lens 5220, rod type condenser body 5230 and condenser lens 5240 are placed, in this order, in the optical axis of the illumination light 5600 emitted from the aforementioned variable light source 5210 and incident to the side of the TIR prism 5300.

The projection apparatus 5010 implements a color display on the screen 5900 by using a single spatial light modulator 5100 by applying a sequential color display method. The variable light source 5210, may include a red laser light source 5211, a green laser light source 5212 and a blue laser light source 5213 which allow individual controls of the emission states, performs the operation of dividing one frame of display data into a plurality of sub-fields (i.e., three sub-fields corresponding to red (R), green (G) and blue (B) in this case) and making each of the red laser light source 5211, green laser light source 5212 and blue laser light source 5213 turned on in time series at the time band corresponding to each color as described in detail later. With the configuration as shown for, the projection apparatus 5010, the control unit 5500 similarly configured to the control apparatus 300 described above controls the spatial light modulator 5100 (i.e. the spatial light modulation element 200) by applying the control method exemplified in FIG. 16 described above.

FIG. 26 is a functional block diagram for showing a configuration of a projection apparatus according to another preferred embodiment of the present invention. The projection apparatus 5020 is a so-called multiple-plate projector comprising a plurality of spatial light modulators 5100 (i.e., 5100R, 5100G and 5100B), which is the difference from the above described projection apparatus 5010. The projection apparatus 5020 comprises a plurality of spatial light modulators 5100, and a light separation/synthesis optical system 5310 is provided between the projection optical system 5400 and each of the spatial light modulators 5100. The light separation/synthesis optical system 5310 comprises a TIR prism 5311, color separation prism 5312 and color separation prism 5313. The TIR prism 5311 has the function of leading an illumination light 5600 incidents from the side of the optical axis of the projection optical system 5400 to the spatial light modulator 5100 side. The color separation prism 5312 has the functions of separating red (R) light from an incident light 5601 incident by way of the TIR prism 5311 and making the red light incident to the red light-use spatial light modulators 5100R, and of leading the reflection light 5602R of the red light to the TIR prism 5311.

Similarly to above described image display systems, the color separation prism 5313 has the functions of separating blue (B) and green (G) lights from the incident light 5601 transmitted through the TIR prism 5311 and projected to the blue color-use spatial light modulators 5100B and green color-use spatial light modulators 5100G, and of leading the reflection light 5602B of the blue and the reflection light 5602G of the green light to the TIR prism 5311. Therefore, the spatial light modulations of three colors of R, G and B are simultaneously performed at three spatial light modulators 5100, respectively, and the reflection lights 5602R, 5602B and 5602G after the operation of the modulations become the projection light 5603 through the projection optical system 5400 to project on the screen 5900 to carry out color display.

In this exemplary embodiment of the projection apparatus 5020, the control unit 5500 is configured similarly to the control apparatus 300 described above that controls the plurality of spatial light modulators 5100 by using the modulation control signal 440 combining the first mirror control signal 411 and second mirror control signal 421 as described above. It is understood that various modifications are conceivable for a light separation/synthesis optical system in lieu of being limited to the light separation/synthesis optical system 5310.

Figure 27A:
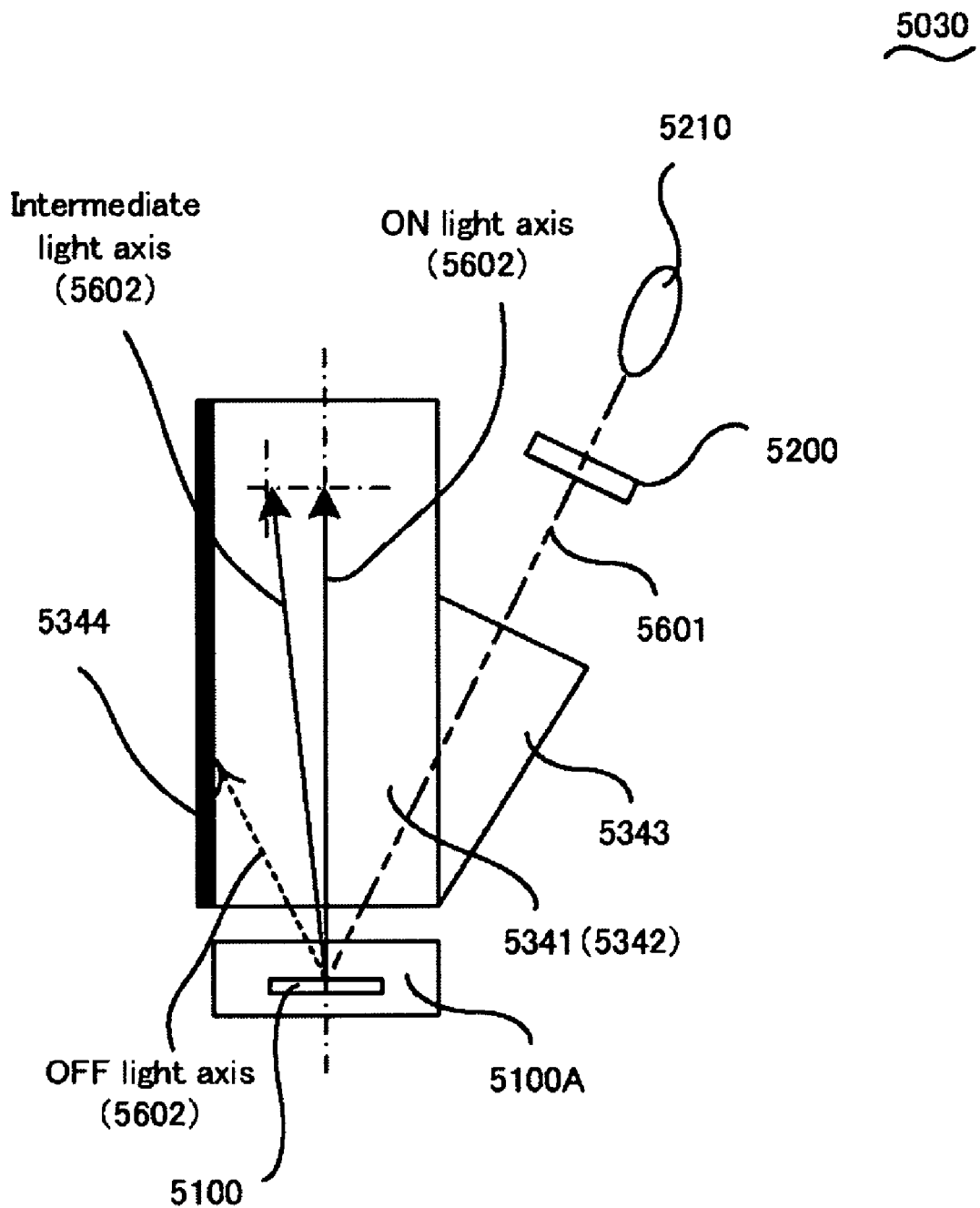
FIG. 27A is a side view diagram of a synthesis optical system of a projection apparatus according to the preferred embodiment of the present invention.
Figure 27B:
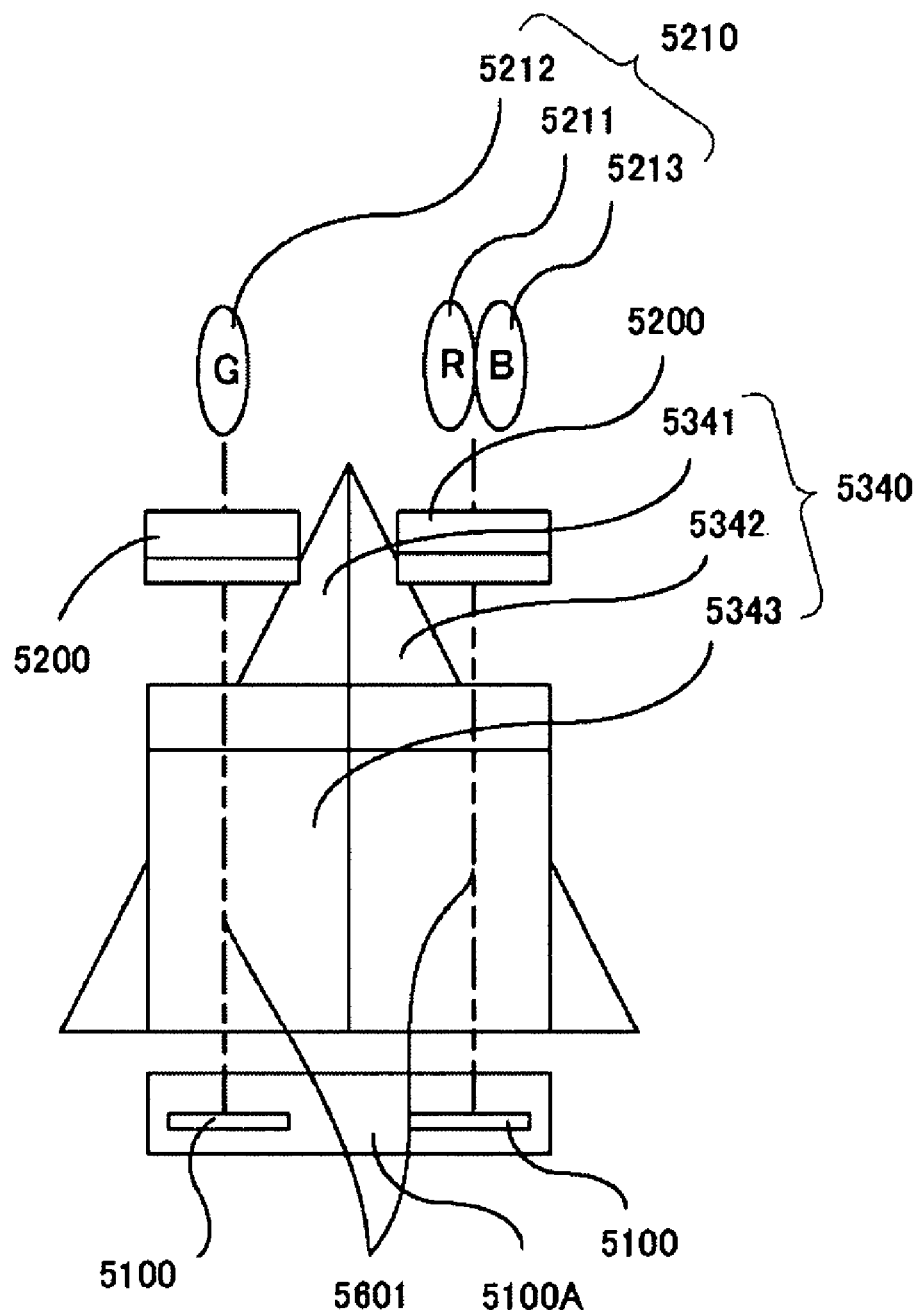
FIG. 27B is a front view diagram of a synthesis optical system of a projection apparatus according to the preferred embodiment of the present invention.
Figure 27C:
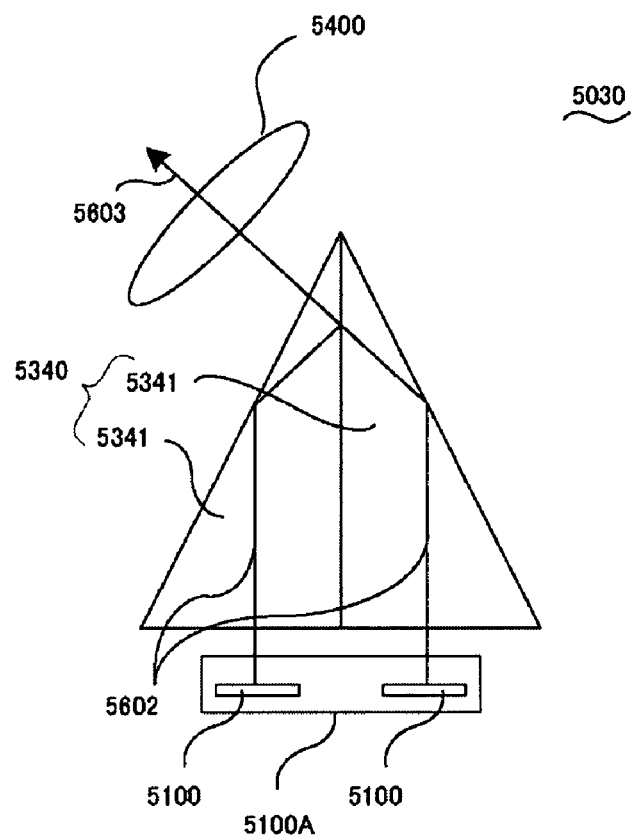
FIG. 27C is a rear view diagram of a synthesis optical system of a projection apparatus according to the preferred embodiment of the present invention.
Figure 27D:
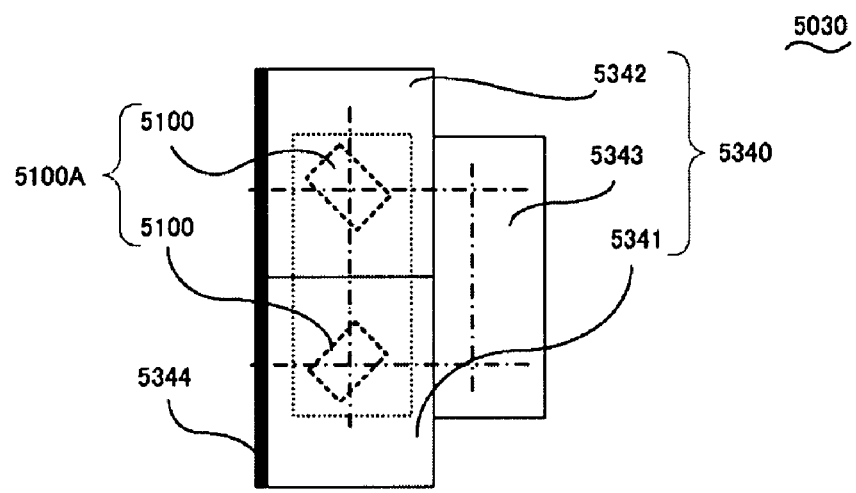
FIG. 27D is an upper plain view diagram of a synthesis optical system of a projection apparatus according to the preferred embodiment of the present invention.

FIGS. 27A, 27B, 27C and 27D are configuration diagrams of the optical system of a projection apparatus using a plurality of spatial light modulators 5100. FIG. 27A is a side view of a synthesis optical system according to the present embodiment; FIG. 27B is the front view; FIG. 27C is the rear view; and FIG. 27D is the upper plain view. The optical system of a projection apparatus 5030 according to the present embodiment comprises a device package 5100A integrally incorporating a plurality of spatial light modulators 5100, a color synthesis optical system 5340, a light source optical system 5200 and a variable light source 5210. The plurality of spatial light modulators 5100 (i.e., spatial light modulation elements 200) incorporated in the device package 5100A are fixed in a manner that the rectangular contour of each of the modulators 5100 is inclined by approximately 45 degrees, in the horizontal plane, in relation to each side of the device package 5100A of similar rectangular contour.

The color synthesis optical system 5340 is placed on the device package 5100A. The color synthesis optical system 5340 comprises prisms 5341 and 5342 of a right-angle triangle pole of a result of joining together so as to make an equilateral triangle column on the longitudinal side and a light guide block 5343 of a right-angle triangle column of a result of joining slope surfaces, with the bottom surface facing up, on the side faces of the prisms 5341 and 5342. A light absorption body 5344 is provided on the prisms 5341 and 5342, on the side surface and on the reverse side of the face where the light guide block 5343 is adhesively attached.

The bottom of the light guide block 5343 is equipped with the light source optical system 5200 of the green laser light source 5212, and the light source optical system 5200 of the red laser light source 5211 and blue laser light source 5213, with each of them having a vertical optical axis. The illumination light 5600 emitted from the green laser light source 5212 is incident to the spatial light modulator 5100, on one side, which is positioned immediately under the prism 5341 as an incident light 5601 through the light guide block 5343 and prism 5341. Also, the illumination lights 5600 respectively emitted from the red laser light source 5211 and blue laser light source 5213 are incident to the spatial light modulator 5100, on the other side, which is positioned immediately under the prism 5342 as the incident light 5601 by way of the light guide block 5343 and prism 5342.

The red and blue incident lights 5601 projected onto the spatial light modulator 5100 is reflected along a vertically upward direction as a reflection light 5602 transmitted into the prism 5342 to further reflect from the external surface that is adhesively attached. According to this order of light transmission through the prism 5342, followed by transmitting the light to the projection optical system 5400 for displaying an image by applying the projection light 5603. Meanwhile, the green incident light 5601 is projected to the spatial light modulator 5100 and reflected vertically upward to project as a reflection light 5602 through the prism 5341 and further reflected from the external surface of the prism 5341, along the same light path as the red and blue reflection lights 5602 and incident to the projection optical system 5400. The light projected through the projection optical system 5400 is processed to become the projection light 5603 when the state of the mirror 212 is operated in the ON state.

As described above, the mirror device according to the present embodiment is configured to include at least two spatial light modulators 5100 in a single device package 5100A. One module is illuminated only with the incident light 5601 from the green laser light source 5212. The other one module of the spatial light modulator 5100 is illuminated with the incident light from at least either of the red laser light source 5211 or blue laser light source 5213. Individual modulation lights respectively modulated by two these two spatial light modulators 5100 are projected to the color synthesis optical system 5340 as described above. The light projected from the color synthesis optical system is further magnified by the projection optical system 5400 and projected onto the screen 5900 or the like as the projection light 5603 for image display. Also the projection apparatus 5030 according to the present embodiment comprises a control apparatus 300 which controls the spatial light modulator 5100 by using the modulation control signal 440 including the first mirror control signal 411 and second mirror control signal 421 according to various embodiments and combinations of various control methods as described above.

Although the present invention has been described in terms of the present preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the present invention.

What is claimed is:

1. A display system comprising:
a) a micromirror array comprising a plurality of mirrors;
b) a control function for controlling the mirrors to operated in a first modulation control state by driving the mirrors a first driving scheme and a second modulation control state by driving the mirrors by applying a second driving scheme to move the mirror with a different movement characteristic than the first driving scheme; and
c) a switchover controller for controlling a switch from the first modulation control state by driving the mirrors with the first driving scheme to second modulation control state by driving the mirrors in the second driving scheme, or from the modulation control second state by driving the mirrors in the second driving scheme to the first modulation control state by driving the mirrors in the first driving scheme; wherein the switchover controller switches the state of mirrors at a predetermined point within a frame period.

2. The display system of claim 1, wherein:
the switchover controller switches the state of at least two of the mirrors about simultaneously at a predetermined time within a frame period.

3. The display system of claim 1, wherein:
the second modulation control state comprises an operation state for driving said mirrors with the second driving scheme including an oscillating state to project an intermediate image light intensity between a maximum image light intensity projected from the mirrors in the ON state and a minimum image light intensity projected from the mirrors in the OFF state.

4. The display system of claim 1, wherein:
the mirrors are controlled by said switch controller to switch from the first modulation control state to the second modulation control state sequentially at a time when said mirrors are not operated in the OFF state during switch controller switch from said first modulation control state to said second modulation control state.

5. The display system of claim 1, wherein:
said control function controls the mirrors to operate at an OFF state between the first modulation control state and said second modulation control state.

6. The display system of claim 1, wherein:
said control function controls the mirrors to operate in the first modulation control state at a beginning of a frame and to operate in the second modulation control state at the end of the frame.

7. The display system of claim 1, wherein:
said control function receiving digital data for controlling said modulation control states wherein the display control system converts at least one of the digit data is into a non-binary data and applying the non-binary data to control the modulation control states.

8. The display system of claim 1, wherein:
the switchover controller switching the modulation control state of at least two of the mirrors from one of the modulation control states to a different modulation control state at prescheduled times in a frame.

9. The display system of claim 1 wherein:
the control function receiving incoming signal digital data each comprising (m+n)-bit binary data and said control function further dividing said (m+n) binary bits into upper m bits and lower n bits where m and n representing a first and a second positive integers respectively.

10. The display system of claim 9 wherein:
the control function applies the upper m bits to control said mirrors to operate in the first modulation control state and the control function applies the lower n bits to control said mirrors to operate in the second modulation control state.

11. The display system of claim 9 wherein:
the control function further adjusts a ratio of said m to said n.

12. The display system of claim 9 wherein:
the control function further divides and arranges said digital data between the upper m bits and the lower n bits.

13. A display system comprising:
a) a micromirror array comprising a plurality of mirrors;
b) a control function for controlling the mirrors to operate in a first modulation control state, a second modulation control state, and a third modulation control state by a applying a first, a second and a third driving schemes each comprising a predefined time duration to operate the mirrors in an ON/OFF state, a first oscillation state and a second oscillation state; and
c) a switchover controller for controlling a switch from one of the first, second or third control modulation states to a different control modulation state to drive the mirrors with a different driving scheme; wherein the switchover controller switches the modulation control state of mirrors at a predetermined time according to the predefined time duration within a frame period.

14. A display system, comprising:
a) a mirror array having a plurality of mirrors;
b) a control function for controlling the mirrors in a first modulation control state by applying a first driving scheme and a second modulation control state by applying a second driving scheme to move the mirror with a different movement characteristic than the first driving scheme;
c) a switchover controller for controlling switching from one of said first and second modulation control states to a different modulation control state; and
d) a computing processor for determining a timing to switch between the modulation control states based on a time variation of an image brightness determined by the computing processor by processing incoming data.

15. The display system of claim 14, wherein:
the switch controller further controlling said switchover between said first and second modulation control states for switching said modulation control states within a display frame for at least two of said mirrors each displaying a pixel of an image display for reducing an OFF time as determined by said computing processor.

16. The display system of claim 14, wherein:
the switch controller further controlling said switchover between said first and second modulation control states for switching said modulation control states within a display frame for at least two of said mirrors each displaying a pixel of an image display for reducing an ON time as determined by said computing processor.

* * * * *